United States Patent
Lee et al.

(10) Patent No.: US 9,690,420 B2
(45) Date of Patent: Jun. 27, 2017

(54) DISPLAY DEVICE HAVING TOUCH SENSOR

(71) Applicant: LG Display Co., Ltd., Seoul (KR)

(72) Inventors: Sunhwa Lee, Paju-si (KR); Euihyun Chung, Goyang-si (KR); Seongjun Cho, Paju-si (KR); Wondoo Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/884,384

(22) Filed: Oct. 15, 2015

(65) Prior Publication Data

US 2016/0378239 A1    Dec. 29, 2016

(30) Foreign Application Priority Data

Jun. 24, 2015 (KR) .................. 10-2015-0089834

(51) Int. Cl.
*G06F 3/041* (2006.01)
*G09G 3/36* (2006.01)

(52) U.S. Cl.
CPC .......... *G06F 3/0416* (2013.01); *G06F 3/0412* (2013.01); *G09G 3/3607* (2013.01); *G09G 2300/0426* (2013.01); *G09G 2300/0443* (2013.01); *G09G 2300/0452* (2013.01); *G09G 2310/08* (2013.01); *G09G 2320/0242* (2013.01)

(58) Field of Classification Search
CPC ...... G06F 3/0416; G06F 3/0412; G06F 3/044; G09G 3/3607; G09G 2320/0242; G09G 2310/08; G09G 2300/0443; G09G 2300/0426; G09G 2300/0452
See application file for complete search history.

(56) References Cited

U.S. PATENT DOCUMENTS

| | | | |
|---|---|---|---|
| 2008/0180400 A1* | 7/2008 | Kim .................. | G06F 3/044 345/173 |
| 2012/0218199 A1* | 8/2012 | Kim .................. | G06F 3/0412 345/173 |
| 2014/0198087 A1* | 7/2014 | Knausz .............. | G06F 1/3218 345/212 |

* cited by examiner

*Primary Examiner* — Ibrahim Khan
(74) *Attorney, Agent, or Firm* — Fenwick & West LLP

(57) ABSTRACT

A touch sensing device comprises a display panel including a plurality of data lines and a plurality of sensor interconnection lines, the plurality of data lines connected to a plurality of pixels of the display panel, and the plurality of sensor interconnection lines connected to a plurality of touch electrodes of the display panel, each pixel including a plurality of sub-pixels that each display a distinct color. A pattern of sub-pixels is arranged in the display panel such that a same number of sub-pixels for each distinct color is arranged adjacent to a first side and adjacent to a second side of one or more of the plurality of sensor interconnection lines, each of the sub-pixels for each distinct color being adjacent to either the first side or the second side of a corresponding one of the sensor interconnection lines.

21 Claims, 18 Drawing Sheets (A)

(B)

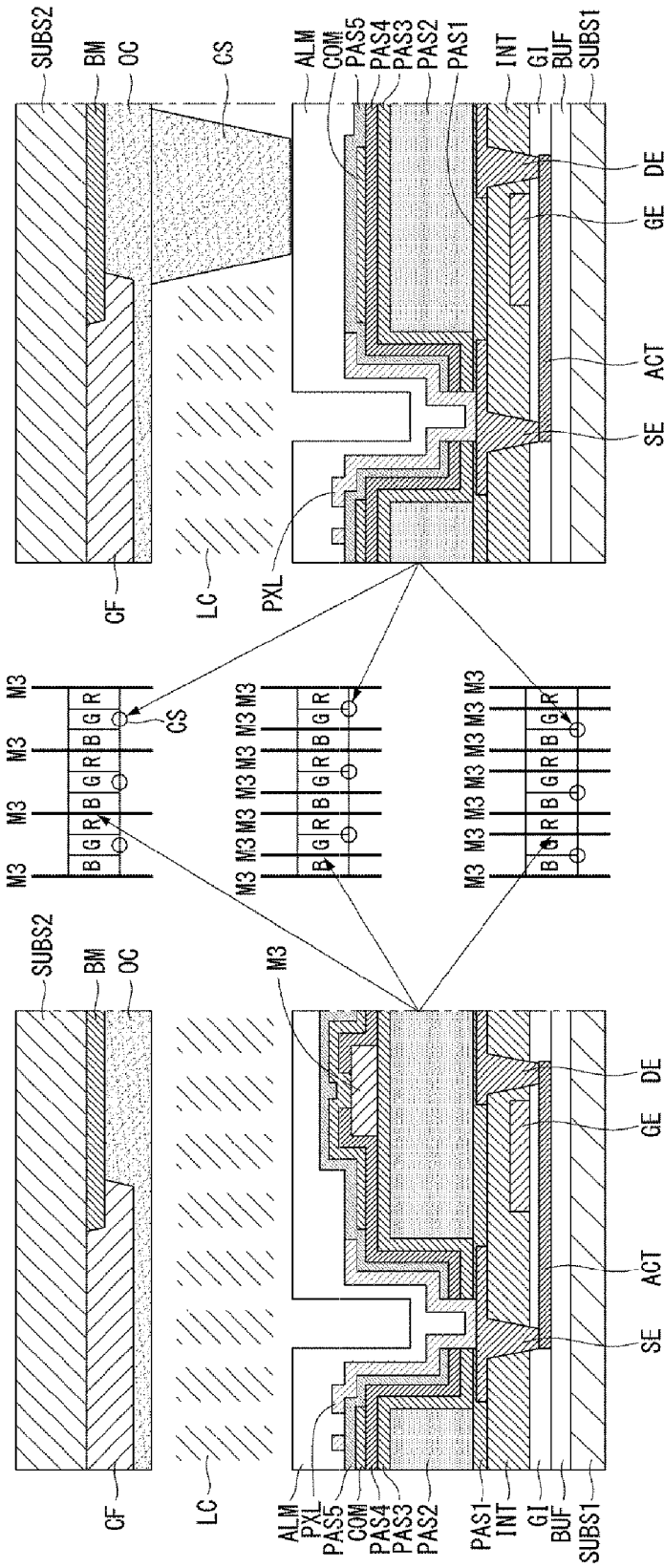

DISPLAY DEVICE HAVING TOUCH SENSOR

This application claims the benefit of Korean Patent Application No. 10-2015-0089834 filed on Jun. 24, 2015, the entire contents of which are incorporated herein by reference for all purposes as if fully set forth herein.

BACKGROUND

Technical Field

The present disclosure relates to a display device having touch sensors embedded in a pixel array.

Discussion of the Related Art

A user interface (UI) enables communication between a person (user) and various electrical and electronic devices such that the user can easily control the devices. Examples of the user interface include a keypad, a keyboard, a mouse, an on-screen display (OSD), a remote controller having an infrared or radio frequency (RF) communication function and the like. The user interface is developed to satisfy user emotion and to improve operation convenience. Recently, the user interface has evolved into a touch UI, speech recognition UI, three dimensional (3D) UI and the like.

The touch UI is included in mobile information devices such as smartphones and extended and applied to notebook computers, computer monitors, home appliances and the like. A technique (referred to as "in-cell touch sensor" hereinafter) of embedding touch sensors in a pixel array of a display panel has recently been proposed. The in-cell touch sensor enables installation of touch sensors in the display panel without increasing the thickness of the display panel.

The in-cell touch sensor uses electrodes connected to pixels as sensor electrodes C1 to C4 as shown in FIG. 1. For example, the in-cell touch sensor can divide a common electrode COM for supplying a common voltage Vcom to pixels of a liquid crystal display (LCD) and use the divided common electrodes as sensor electrodes of touch sensors, as shown in FIG. 1. Sensor interconnection lines W are connected to the sensor electrodes. The common voltage Vcom and a touch drive signal Tdrv are supplied to the common electrodes COM through the sensor interconnection lines.

When the sensor interconnection lines are embedded in a pixel array, the sensor interconnection lines are electrically coupled to pixel electrodes or signal lines. Accordingly, images may not be displayed in distinct colors on the display panel.

The display panel may have spacers provided therein. The spacers are formed between an upper substrate and a lower substrate of the LCD to maintain a cell gap of a liquid crystal layer. The spacers may be provided on the sensor interconnection lines W. In this case, an alignment layer may be raised by the thickness of the sensor interconnection lines W and thus the alignment layer may come into contact with the spacers. When the spacers come into contact with the alignment layer, particles may be generated due to friction between the spacers and the alignment layer. This causes bright point defects or hot pixels.

SUMMARY

An object of the present disclosure is to provide a display device capable of preventing color deterioration due to a touch sensor embedded in a pixel array.

A touch sensing device supporting a display driving period and a touch sensor driving period in each frame period is disclosed. The device comprises a display panel including a plurality of data lines and a plurality of sensor interconnection lines, the plurality of data lines connected to a plurality of pixels of the display panel, and the plurality of sensor interconnection lines connected to a plurality of touch electrodes of the display panel, each pixel including a plurality of sub-pixels that each display a distinct color. The device further includes a data driver that drives data signals to the plurality of pixels via the plurality of data lines during the display driving period of the frame period. The device also includes a touch sensor driver that applies a touch driving voltage for sensing touch to the plurality of touch electrodes via the plurality of sensor interconnection lines during the touch sensor driving period of the frame period, and the touch sensor driver applies a common voltage to the plurality of touch electrodes via the plurality of sensor interconnection lines during the display drive period of the frame period, the touch sensor driving period non-overlapping with the pixel driving period. In one embodiment, a pattern of sub-pixels is arranged in the display panel such that a same number of sub-pixels for each distinct color is arranged adjacent to a first side and adjacent to a second side of one or more of the plurality of sensor interconnection lines, each of the sub-pixels for each distinct color being adjacent to either the first side or the second side of a corresponding one of the sensor interconnection lines.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 16 is a view showing a pixel position at which a spacer is disposed and a pixel position having no spacer according to the present invention.

DETAILED DESCRIPTION

Figure 1:
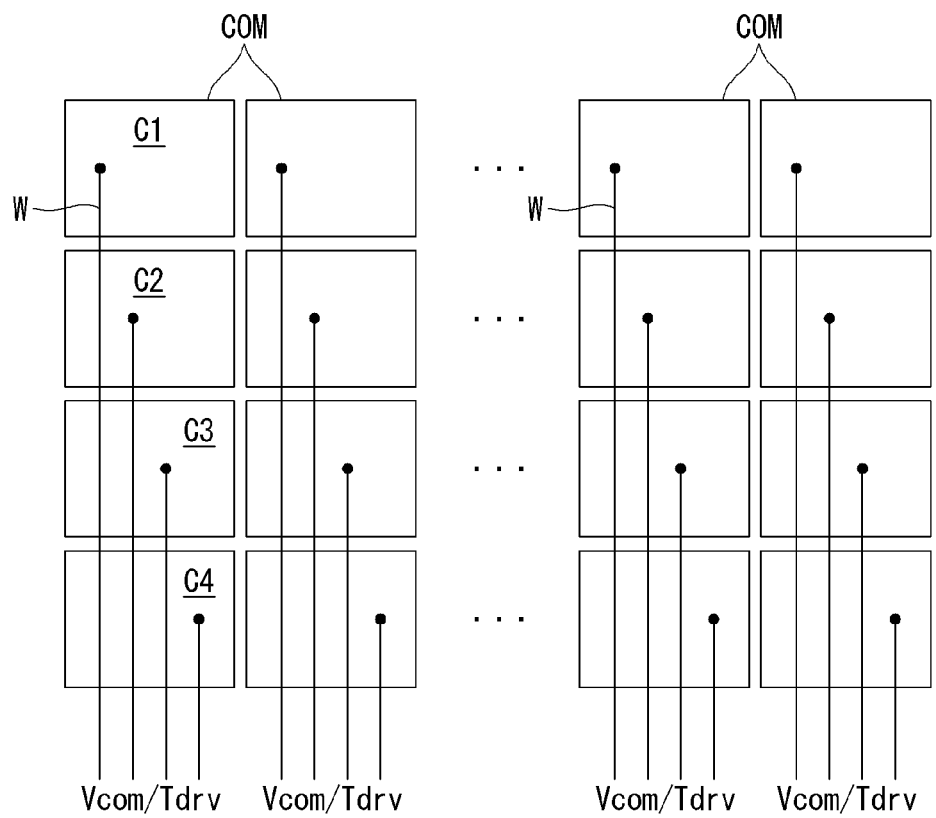
FIG. 1 illustrates sensor interconnection lines connected to touch sensors according to the related art.
Figure 2:
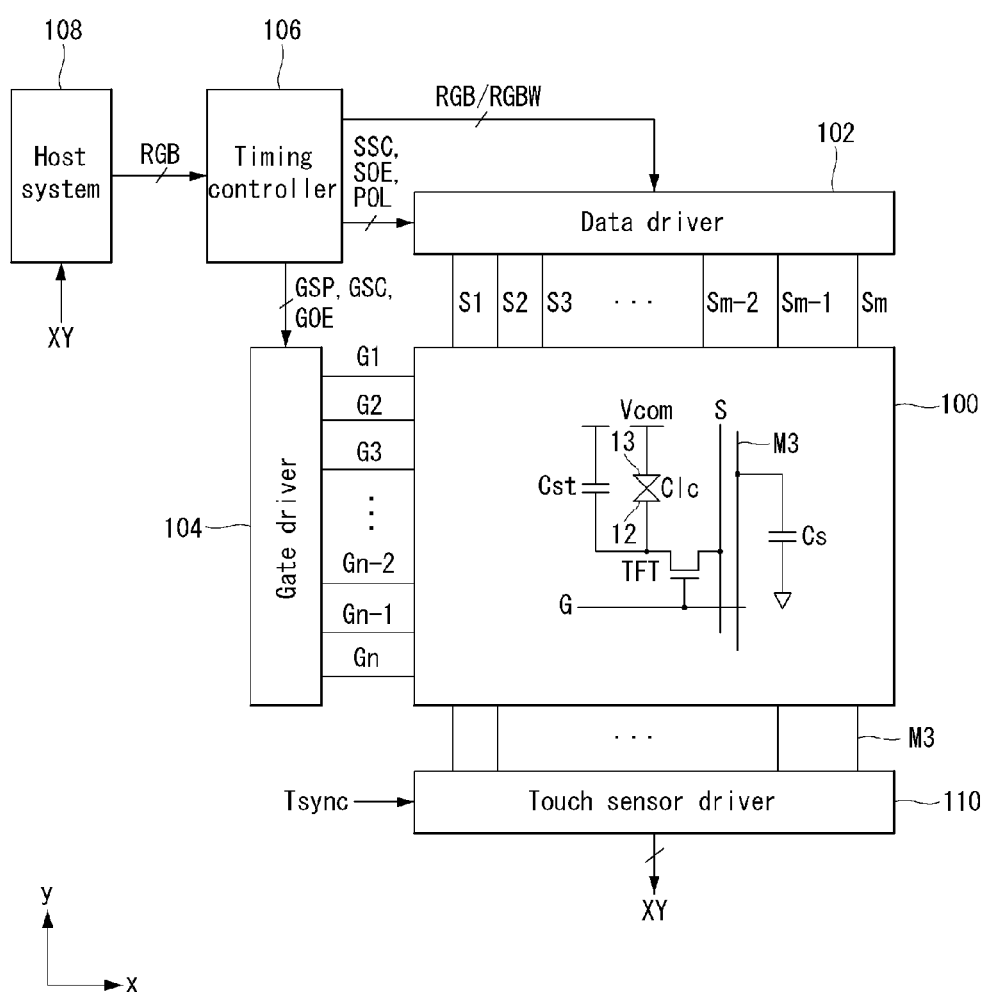
FIG. 2 is a block diagram of a display device according to one embodiment of the present disclosure.

Description will now be given in detail to exemplary embodiments disclosed herein with reference to the accompanying drawings. For the sake of brief description with reference to the drawings, the same or equivalent components may be provided with the same reference numbers, and description thereof will not be repeated.

The present disclosure will be described in detail through different embodiments with reference to the accompanying drawings. The same reference numbers will be used throughout this specification to refer to the same or like parts. In the following description of the present disclosure, a detailed description of known functions and configurations incorporated herein will be omitted when it may obscure the subject matter of the present disclosure.

A display device of the present disclosure may be implemented as a flat panel display such as a liquid crystal display (LCD), a field emission display (FED), a plasma display panel (PDP), an organic light emitting diode (OLED) and an electrophoretic display (EPD). While the following embodiments are based on an LCD as an exemplary flat panel display, the display device of the present disclosure can be any display device to which the in-cell touch sensor can be applied.

A touch sensor of the present disclosure may be implemented as a capacitive touch sensor that can be embedded in a pixel array, for example, a mutual capacitance sensor or a self-capacitance sensor. While the following description is based on the self-capacitance sensor as an exemplary touch sensor, the present disclosure is not limited thereto.

FIGS. 2 to 4B illustrate the display device of the present disclosure. FIG. 5 is a waveform diagram showing a common voltage Vcom and a touch drive signal Tdrv.

Referring to FIGS. 2 to 5, the display device of the present disclosure includes a touch sensing unit. The touch sensing unit senses touch input using touch sensors Cs included therein. Since capacitance of a self-capacitive touch sensor Cs increases when a user's finger touches the touch sensor Cs, the touch sensing unit can sense touch input on the basis of capacitance variation of the self-capacitive touch sensor Cs.

A liquid crystal layer is formed between two substrates of a display panel 100. Liquid crystal molecules are operated by an electric field generated due to a difference between a data voltage applied to a pixel electrode 12 and a common voltage Vcom applied to a sensor electrode 13. A pixel array of the display panel 100 includes pixels defined by data lines S (S1 to Sm, m being a positive integer) and gate lines G (G1 to Gn, n being a positive integer) and the touch sensors Cs connected to the pixels.

Each touch sensor Cs includes a sensor electrode and a sensor interconnection line M3 connected to the sensor electrode. Sensor electrodes COM (C1 to C4) may be patterned by a method of dividing a common electrode. Each sensor electrode COM overlaps a plurality of pixels. The sensor electrodes COM (C1 to C4) are provided with the common voltage Vcom for a display drive period Td and the touch drive signal Tdrv for a touch sensor drive period Tt through the sensor interconnection line M3. The common voltage Vcom is commonly applied to pixels through the sensor electrodes.

Sensor interconnection lines M3 are arranged at the boundaries of sub-pixels in such a manner that the sensor interconnection lines M3 avoid spacers. The sensor interconnection lines M3 may be superposed on the data lines S1 to Sm having insulating layers PAS1, PAS2 and PAS3 formed therebetween such that apertures of the pixels are not reduced.

Since the touch sensors Cs are embedded in the pixel array, the touch sensors Cs are coupled to the pixels through parasitic capacitance. To reduce mutual influence of the pixels and the touch sensors Cs due to coupling thereof, the present disclosure drives the display panel 100 by time-dividing one frame period into a period in which the pixels are driven (referred to as "display driving period" hereinafter) and a period in which the touch sensors are driven (referred to as "touch sensor driving period" hereinafter), as shown in FIG. 5. One frame period can be divided into one or more display driving periods Td and one or more touch sensor driving periods Tt. Data of an input image is written to the pixels during the display driving period Td. The touch sensors are driven to sense touch input during the touch sensor driving period Tt.

Figure 3:
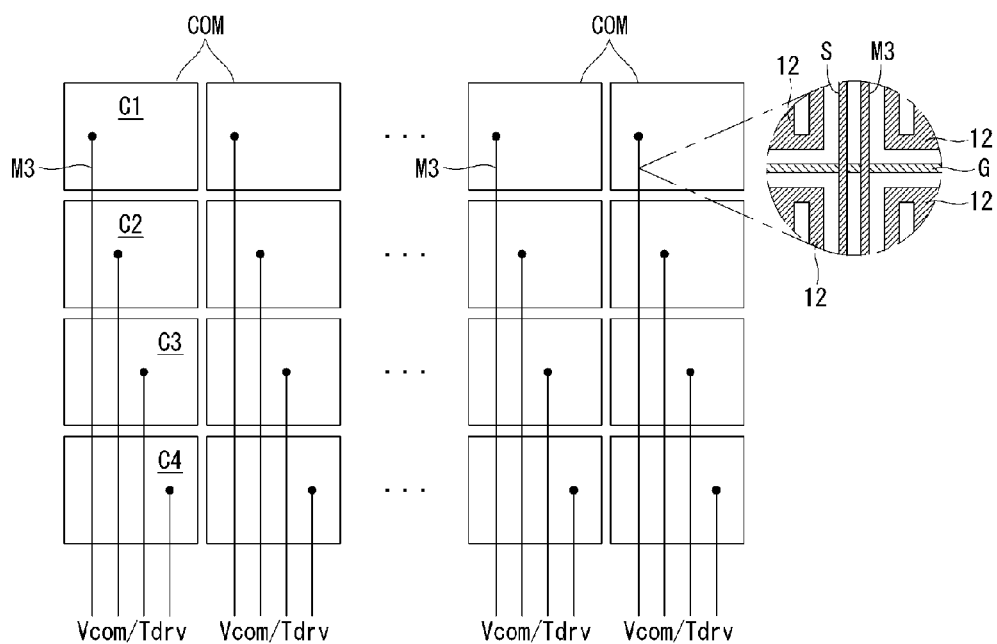
FIG. 3 illustrates the structure of a touch sensor shown in FIG. 2 according to one embodiment of the present disclosure.

Each pixel includes a pixel thin film transistor (TFT) formed at each of intersections of the data lines S1 to Sm and the gate lines G1 to Gn, a pixel electrode provided with a data voltage through the pixel TFT, a common electrode to which the common voltage Vcom is applied, and a storage capacitor Cst connected to the pixel electrode to maintain a voltage of a liquid crystal cell. In FIG. 3, the TFT is omitted.

Figure 4A:
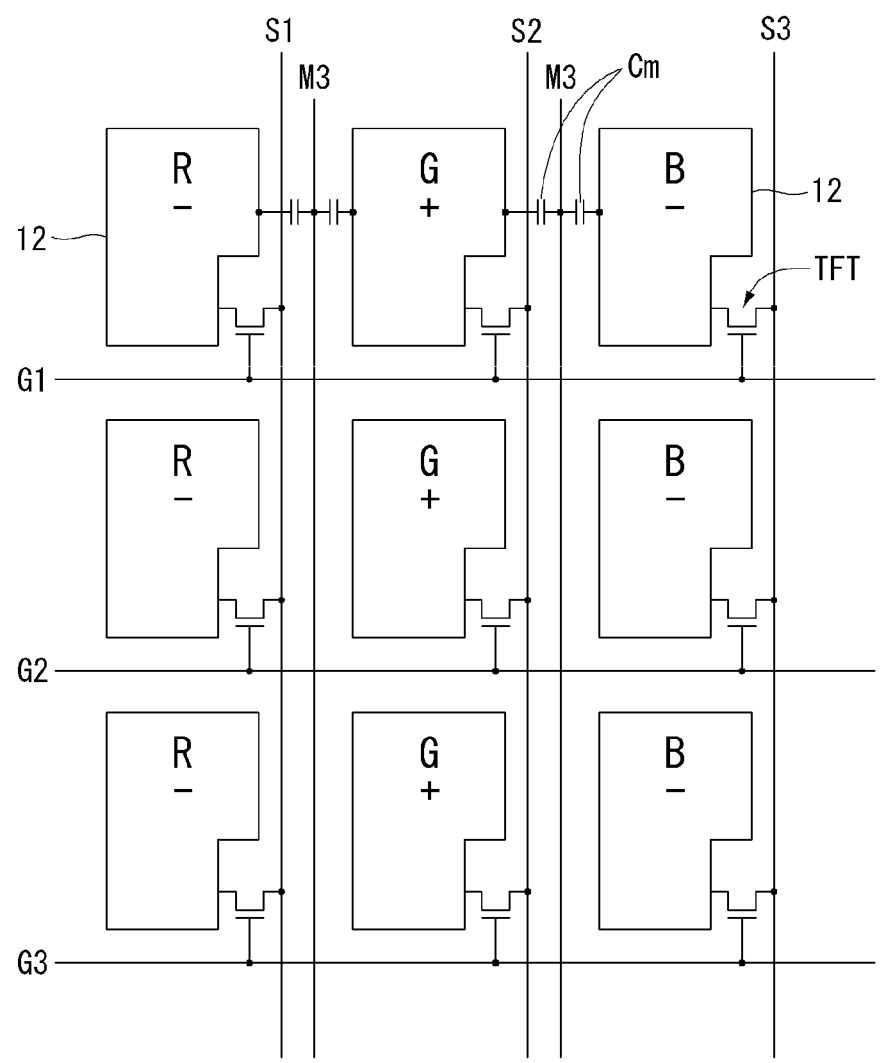
FIGS. 4A and 4B illustrate color arrangement of pixels according to one embodiment of the present disclosure.
Figure 4B:
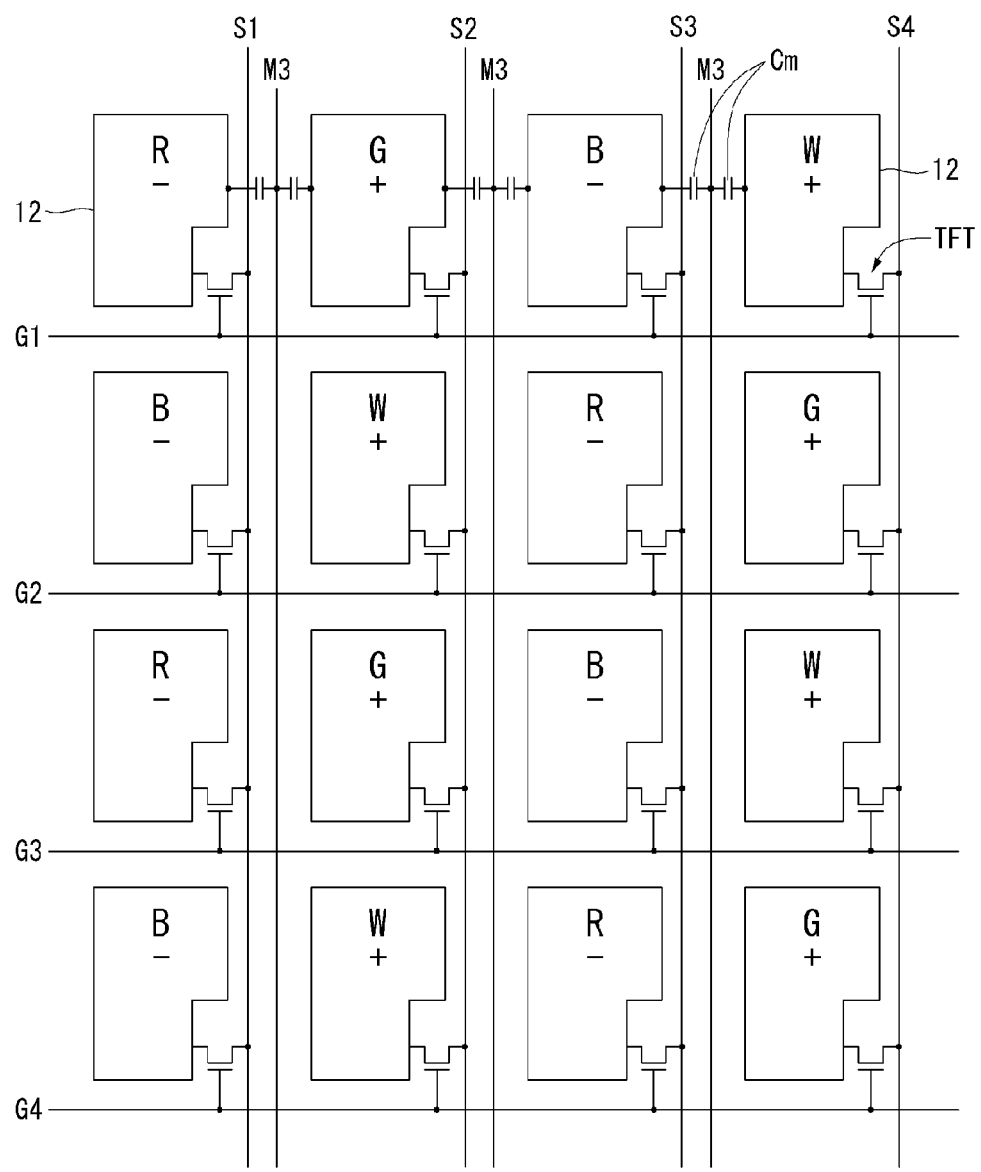
Figure 5:
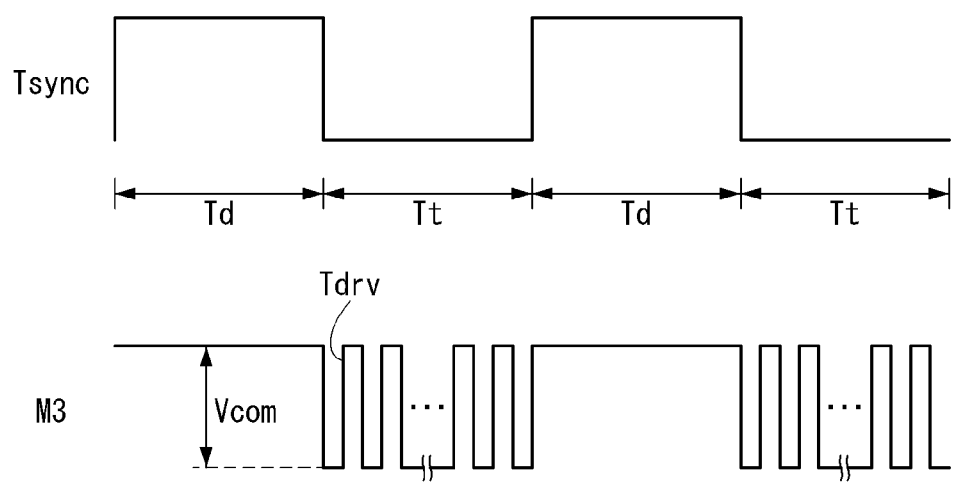
FIG. 5 is a waveform diagram showing a common voltage and a touch drive signal applied to the touch sensor shown in FIG. 2.

The pixels can be divided into a red sub-pixel R, a green sub-pixel G and a blue sub-pixel B, as shown in FIG. 4A. Alternatively, the pixels can be divided into a red sub-pixel R, a green sub-pixel G, a blue sub-pixel B, and a white sub-pixel W, as shown in FIG. 4B.

The upper substrate of the display panel 100 may have a black matrix, a color filter and the like, formed thereon. The lower substrate of the display panel 100 may be implemented in a color filter on TFT (COT) structure. In this case, the color filter can be formed on the lower substrate of the display panel 100. Polarizers are respectively attached to the upper substrate and the lower substrate of the display panel 100 and alignment layers for setting a pretilt angle are formed on the inner surfaces of the polarizers, which come into contact with the liquid crystal. Spacers for maintaining a cell gap of the liquid crystal layer are formed between the upper substrate and the lower substrate of the display panel 100.

A backlight unit may be provided to the backside of the display panel 100. The backlight unit is configured in the form of an edge type or direct type backlight unit and emits light to the display panel 100. The display panel 100 can be implemented in any known liquid crystal mode such as a twisted nematic (TN) mode, a vertical alignment (VA) mode, an in-plane switching (IPS) mode and a fringe field switching (FFS) mode. A spontaneous emission display device such as an organic light-emitting diode display does not require the backlight unit.

The display device of the present disclosure further includes display drivers such as a data 102, a gate driver 104, and a timing controller 106 for writing data of an input image to the pixels and a touch sensor driver 110 for driving the touch sensors Cs.

The display drivers 102, 104 and 106 and the touch sensor driver 110 are synchronized with each other in response to a synchronization signal Tsync.

The display drivers 102, 104 and 106 write data to the pixels for the display driving period Td. The pixels need to hold a data voltage charged therein for a previous display driving period Td since TFTs are turned off for the touch sensor driving period Tt. The display drivers 102, 104 and 106 can supply an alternating current (AC) signal having the same phase as the touch drive signal Tdrv applied to the touch sensors Cs to the signal lines S1 to Sm and G1 to Gn in order to minimize parasitic capacitance between the touch sensors Cs and the signal lines connected to the pixels. Here, the signal lines connected to the pixels include the data lines S1 to Sm and the gate lines G1 to Gn.

The data driver 102 converts digital video data RGB and RGBW of an input image, received from a timing controller 106 for the display driving period Td, into an analog positive/negative gamma compensation voltage so as to output a data voltage. The data voltage output from the data driver 102 is supplied to the data lines S1 to Sm. The data driver 102 can apply an AC signal having the same phase as the touch drive signal Tdrv applied to the touch sensors for the touch sensor driving period Tt to the data lines S1 to Sm. This is because voltages at both ends of parasitic capacitance are simultaneously varied and the quantity of charges in the parasitic capacitance decreases as a difference between the voltages decreases.

The gate driver 104 selects a line of the display panel 100 to which the data voltage is written by sequentially supplying a gate pulse (or scan pulse) synchronized with the data voltage to the gate lines G1 to Gn for the display driving period Td. The gate pulse swings between a gate high voltage VGH and a gate low voltage VGL. The gate pulse is applied to gates of pixel TFTs through the gate lines G1 to Gn. The gate high voltage VGH is set to a voltage higher than a threshold voltage of the pixel TFTs so as to turn on the pixel TFTs. The gate low voltage VGL is lower than the threshold voltage of the pixel TFTs. The gate driver 104 can apply an AC signal having the same phase as the touch drive signal Tdrv applied to the touch sensors for the touch sensor driving period Tt to the gate lines G1 to Gn.

The timing controller 106 receives timing signals, such as a vertical synchronization signal, a horizontal synchronization signal, a data enable signal and a main clock signal input from a host system 108, and synchronizes operation timings of the data driver 102, the gate driver 104 and the touch sensor driver 110. A scan timing control signal includes a gate start pulse GSP, a gate shift clock signal, a gate output enable signal GOE and the like. A data timing control signal includes a source sampling clock signal SSC, a polarity control signal POL, a source output enable signal SOE and the like.

The timing controller 106 transmits input image data RGB received from the host system 108 to the data driver 102. The timing controller 106 can convert RGB data into RGBW data using a known white gain calculation algorithm and transmit the RGBW data to the data driver 102.

The host system 108 can be implemented as one of a television system, a set top box, a navigation system, a DVD player, a Blu-ray player, a personal computer (PC), a home theater system and a phone system. The host system 108 includes a system on chip (SoC) having a scaler embedded therein and converts digital video data of an input image into a format suitable for the resolution of the display panel 100. The host system 108 transmits timing signals with the digital video data RGB and RGBW of the input image to the timing controller 106. In addition, the host system 108 executes an application program associated with coordinate information XY of touch input, which is input from the touch sensor driver 110.

The timing controller 106 or the host system 108 can generate the synchronization signal Tsync for synchronizing the display drivers 102, 104 and 106 and the touch sensor driver 110.d The touch sensor driver 110 generates the touch driver signal Tdrv for the touch sensor driving period Tt. The touch drive signal Tdrv is supplied to the sensor electrodes 13 (C1 to C4) through the sensor interconnection lines M3. The touch sensor driver 110 can sense a touch point and a touch area by measuring capacitance variations of the touch sensors Cs. The touch sensor driver 110 calculates coordinate information XY of touch input and transmits the calculated coordinate information XY to the host system 108.

A data driver 102 and the touch sensor driver 110 may be integrated in one integrated circuit (IC).

Figure 6A:
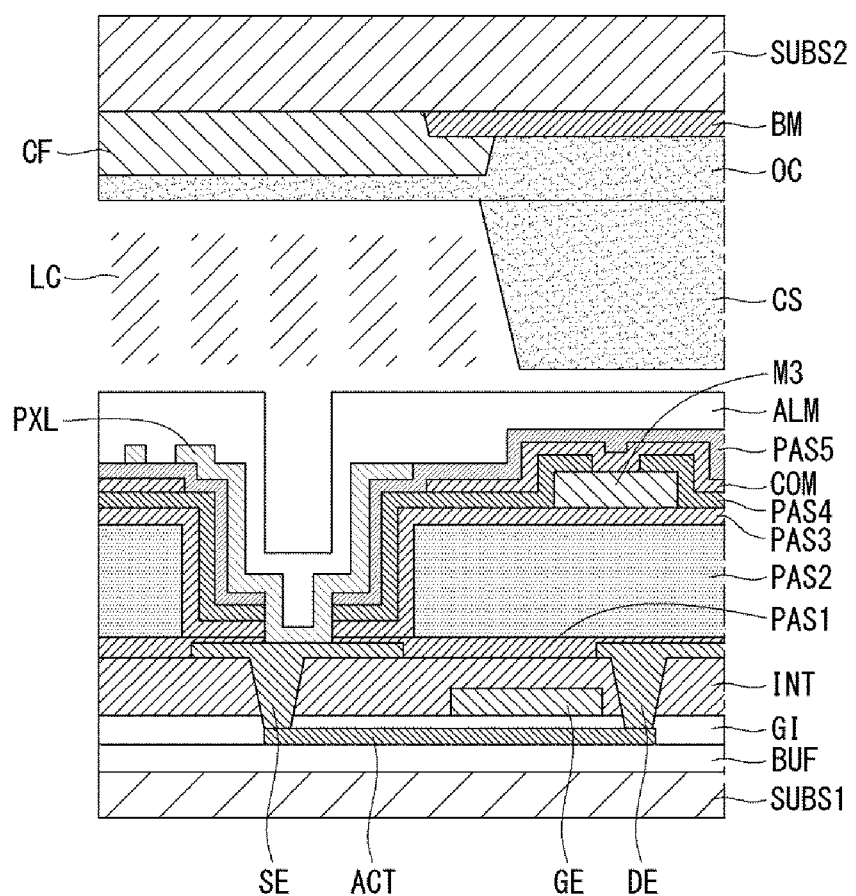
FIGS. 6A and 6B are cross-sectional views of a display panel according to one embodiment of the present disclosure.
Figure 6B:
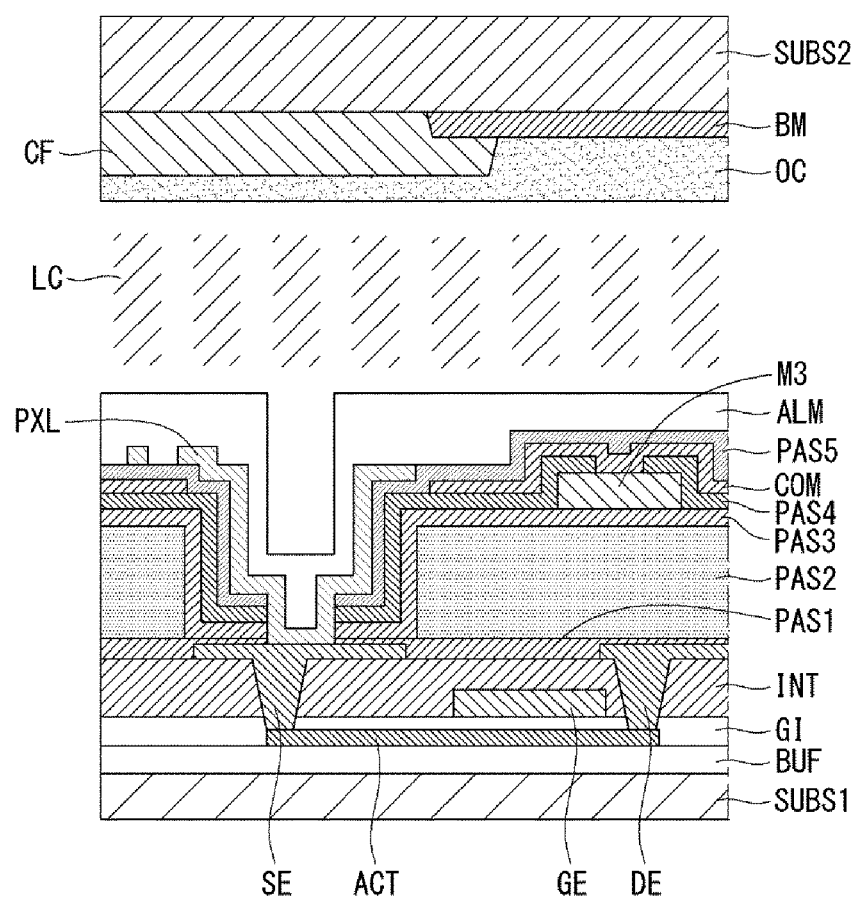

FIGS. 6A and 6B are cross-sectional views of the display device 10.

Referring to FIGS. 6A and 6B, the lower plate of the display panel 10 includes a TFT array provided on the lower substrate SUBS1. The upper plate of the display panel includes a color filter array provided to the upper substrate SUBS2. The liquid crystal layer LC is formed between the upper plate and the lower plate of the display panel 10.

A buffer insulating layer BUF, a semiconductor pattern ACT and a gate insulating layer GI are stacked on the lower substrate SUBS1. A first metal pattern (or gate metal pattern) is formed on the gate insulating layer GI. The first metal pattern includes gates GE of TFTs and gate lines G1 to Gn connected to the gates GE. An interlayer insulating layer INT covers the first metal pattern. A source-drain metal pattern (or second metal pattern) is formed on the interlayer insulating layer INT. The second metal pattern includes date lines S1 to Sm and sources SE and drains DE of the TFTs. The drains DE are connected to the data lines S1 to Sm. The sources SE and the drains DE of the TFTs are connected to the semiconductor patterns ACT of the TFTs through contact holes penetrating the interlayer insulating layer INT.

A first passivation layer PAS1 covers the second metal pattern. A second passivation layer PAS2 is formed on the first passivation layer PAS1. Contact holes for exposing the sources SE of the TFTs are formed in the second passivation layer PAS2. A third passivation layer PAS3 is formed on the second passivation layer PAS2 and a third metal pattern is formed on the third passivation layer PAS3. The third metal pattern includes sensor interconnection lines M3. A fourth passivation layer PAS4 is formed on the third passivation layer PAS3 to cover the third metal pattern. A fourth metal pattern is formed on the fourth passivation layer PAS4. The fourth metal pattern includes sensor electrodes 13 (COM) formed of a transparent electrode material such as indium-tin oxide (ITO). A fifth passivation layer PAS5 is formed on the fourth passivation layer PAS4 to cover the fourth metal pattern. The first, third, fourth and fifth passivation layers PAS1, PAS3, PAS4 and PAS5 may be formed of an inorganic insulating material such as SiOx or SiNx. The second passivation layer PAS2 may be formed of an organic insulating material such as photo-acryl.

The third, fourth and fifth passivation layers PAS3, PAS4 and PAS5 are patterned so as to form contact holes for exposing the sources SE of the TFTs. A fifth metal pattern is formed on the fifth passivation layer PAS5. The fifth metal pattern includes pixel electrodes 12 (PXL) formed of a transparent electrode material such as ITO. An alignment layer ALM is formed on the fifth passivation layer PAS5 to cover the fifth metal pattern.

A black matrix BM and a color filter CF are formed on the upper substrate SUBS2 and an overcoat film OC and spacers CS are formed thereon. The overcoat film OC and the spacers CS may be formed of organic insulating materials.

Figure 10:
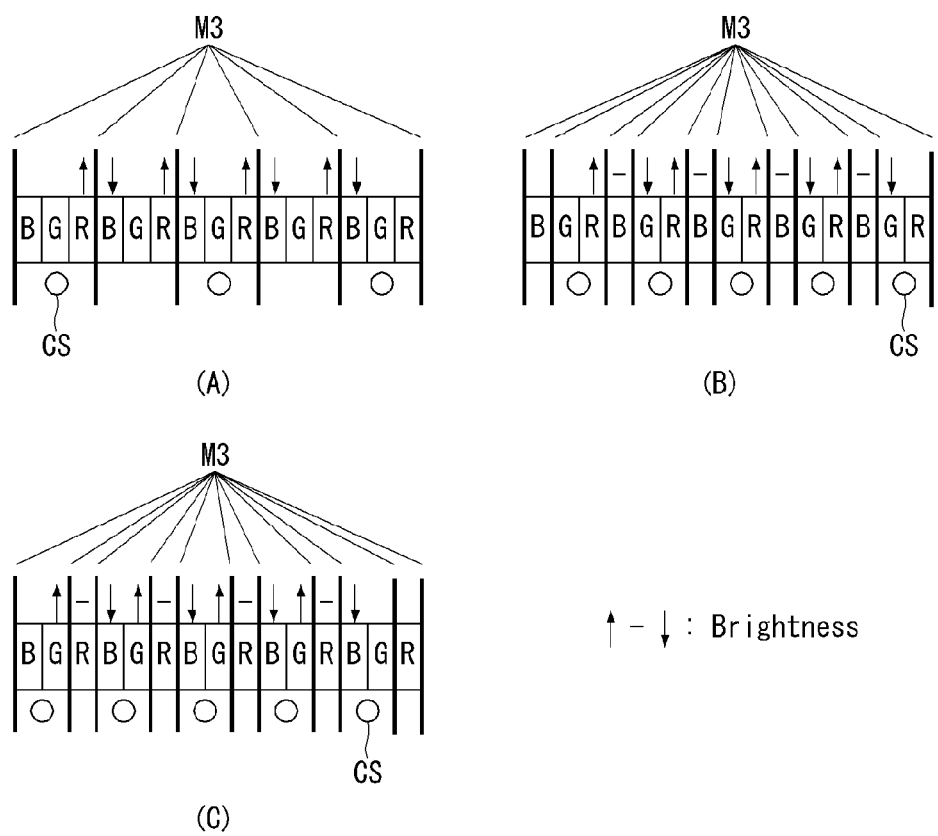
FIG. 10 illustrates sensor interconnection line arrangements according to a first embodiment of the present disclosure.
Figure 11:
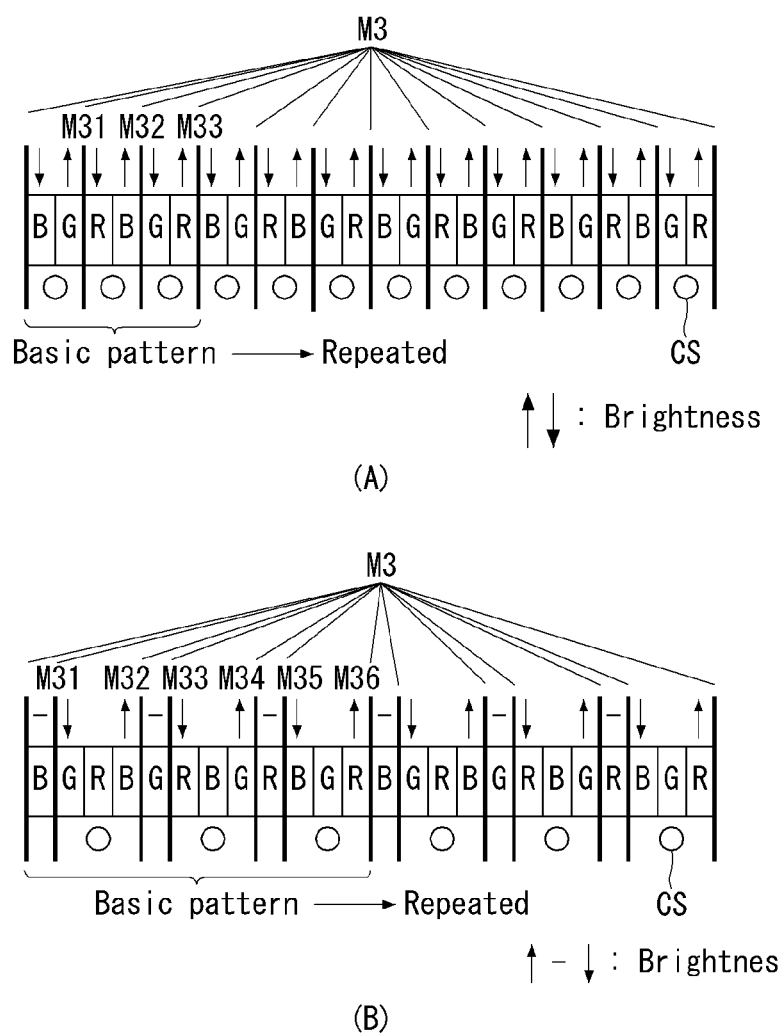
FIG. 11 illustrates sensor interconnection line arrangements according to a second embodiment of the present disclosure.
Figure 12:
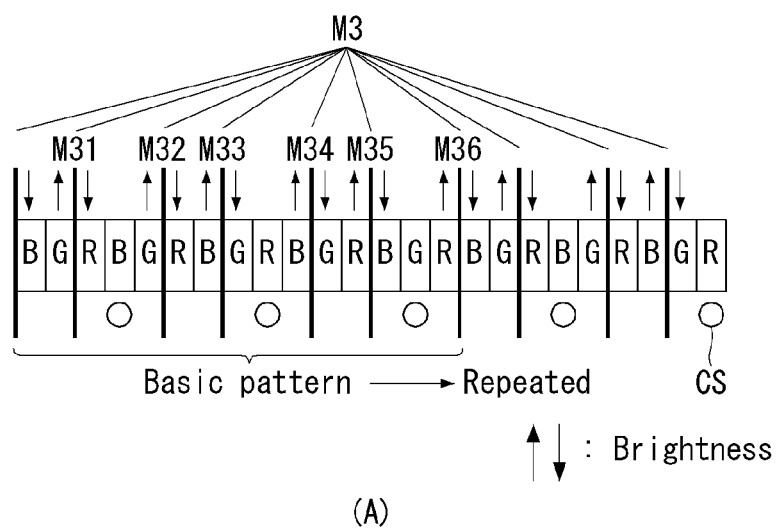
FIG. 12 illustrates sensor interconnection line arrangements according to a third embodiment of the present disclosure.
Figure 12:
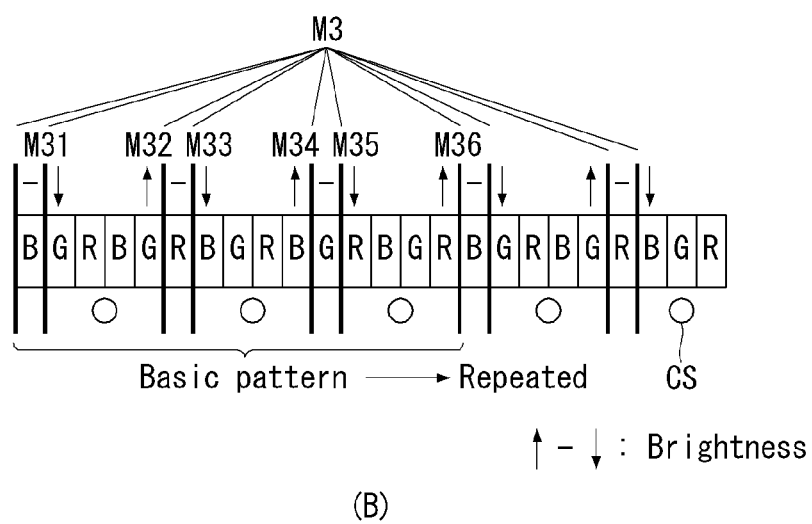

When the spacers CS are disposed on the sensor interconnection lines M3, as shown in FIG. 6A, the alignment layer ALM may be damaged by the spacers CS. The spacers CS are formed between the upper substrate SUBS2 and the lower substrate SUBS1 of the LCD to maintain a cell gap of the liquid crystal layer. When the spacers CS are disposed on the sensor interconnection lines M3, the alignment layer ALM is raised by the thickness of the sensor interconnection lines M3 and thus the alignment layer ALM may come into contact with the spacers CS. The display device may be vibrated during a display device distribution process or a driving circuit of the display device may be vibrated during operation of the display device. When vibration of the display device occurs, the alignment layer ALM raised on the sensor interconnection lines M3 may be damaged by the spacers CS due to friction, thereby generating particles from the materials of the alignment layer and the spacers. This causes bright point defects or hot pixels. The present disclosure prevents the alignment layer ALM from being damaged due to the spacers CS by arranging the spacers CS at positions that avoid the sensor interconnection lines M3. Accordingly, the sensor interconnection lines M3 and the spacers CS do not overlap in the LCD of the present disclosure, distinguished from the structure of FIG. 6B. To this end, the sensor interconnection lines M3 are arranged at positions that avoid the spacers CS in the plane of the display panel, as shown in FIGS. 10, 11 and 12.

The sensor interconnection lines M3 are electrically coupled to the electrodes 12 and 13 of the pixels or the signal lines S1 to Sm and G1 to Gn via parasitic capacitances since the sensor interconnection lines M3 are embedded in the pixel array. Accordingly, color deterioration may occur in an image reproduced through the display panel 10. This is described with reference to FIGS. 4, 7 and 8.

Figure 7:
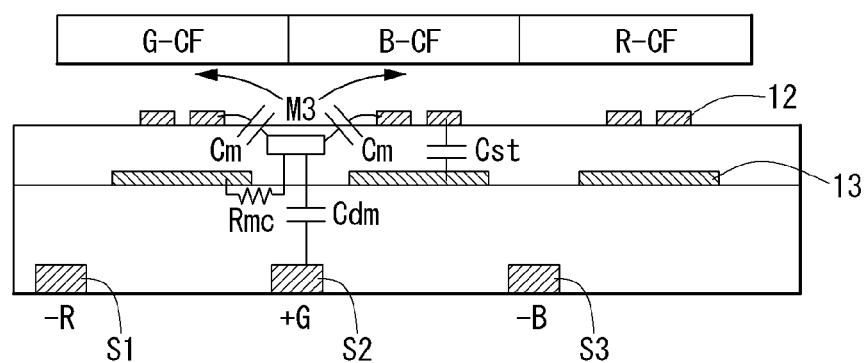
FIG. 7 illustrates parasitic capacitance connected to sensor interconnection lines according to one embodiment of the present disclosure.

FIG. 7 illustrates parasitic capacitances Cdm and Cm connected to the sensor interconnection lines M3.

Referring to FIG. 7, parasitic capacitance Cdm is formed between the sensor interconnection line M3 and the data lines S1, S2 and S3 and parasitic capacitance Cm is formed between the sensor interconnection line M3 and the pixel electrodes 12. The sensor interconnection line M3 is thus connected to the sensor electrodes 13. "Rmc" represents resistance between the sensor interconnection line M3 and the sensor electrodes 13.

The polarity of a data voltage supplied to the display panel 10 can be inverted through column inversion, as shown in FIGS. 4A and 4B. In this case, the polarity of a data voltage applied to pixels on the left of the data lines S1, S2 and S3 is opposite to that applied to pixels on the right of the data lines S1, S2 and S3. The polarity of the data voltage is inverted in the next frame period. Voltages of the pixels on the left and right of the data lines S1, S2 and S3 may be varied due to parasitic capacitance Cm between the sensor interconnection line M3 and the pixel electrodes 12. In FIG. 4A, for example, the charge amount of the green sub-pixel G increases owing to pre-charge effects since a positive green data voltage is continuously supplied thereto. Conversely, the charge amount of the blue sub-pixel B charged with a negative data voltage decreases due to the positive green data voltage. Accordingly, green brightness increases and blue brightness decreases, resulting in a color difference.

Figure 8:
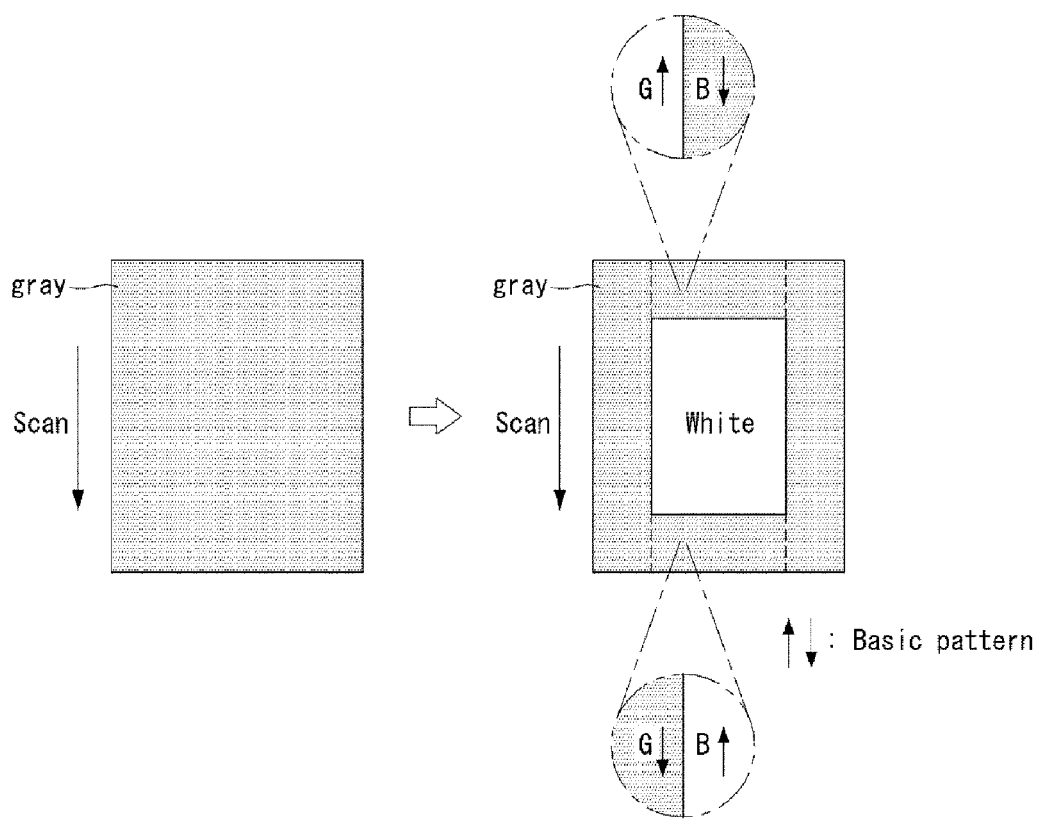
FIG. 8 illustrates a crosstalk test pattern according to one embodiment of the present disclosure.

A crosstalk test writes halftone (gray scale 127) data to all pixels of the display panel 10 and then writes data of peak white gray scale (gray scale 255) to the center of the screen, as shown in FIG. 8. In such crosstalk test, green is bright and blue is dark in the upper part of the screen. Pixels of the lower part of the screen are charged with a voltage having a polarity opposite to the data voltage of the previous frame and thus green is dark and blue is bright in the lower part of the screen.

The sensor interconnection line M3 is superposed on the data lines S1 to Sm such that apertures of the pixels are not reduced.

Figure 9:
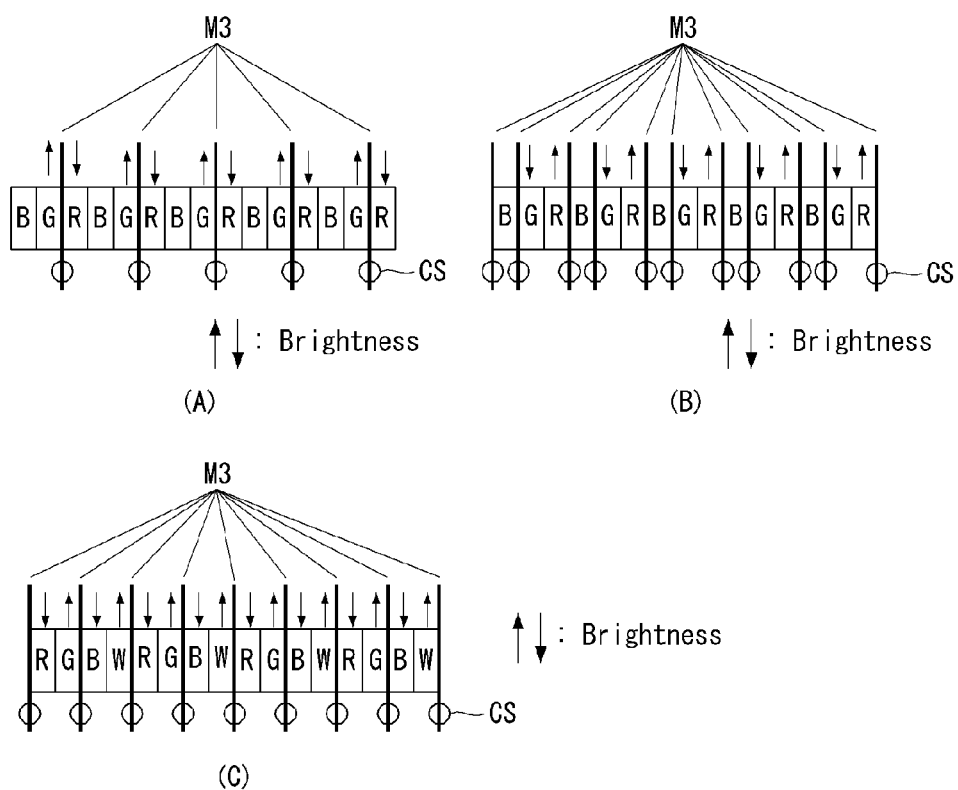
FIG. 9 illustrates an inappropriate sensor interconnection line arrangement.

As described above, damage of the alignment layer or a color difference may be generated according to sensor interconnection line arrangement. When the sensor interconnection line M3 and the spacers CS overlap, as shown in FIG. 9, the alignment layer is damaged.

When sub-pixels arranged on the left of the sensor interconnection line M3 have the same color and sub-pixels arranged on the right of the sensor interconnection line M3 have the same color, a color difference may be generated.

FIG. 9(A) illustrates an example in which one sensor interconnection line M3 is arranged for three sub-pixels in an RGB pixel structure. In this example, since a green sub-pixel G is disposed on the left of the sensor interconnection line M3 and a red sub-pixel R is disposed on the right of the sensor interconnection line M3, green brightness increases and red brightness decreases, resulting in generation of a color difference.

FIG. 9(B) illustrates an example in which two sensor interconnection lines M3 are arranged for three sub-pixels in the RGB pixel structure. The brightness of sub-pixels disposed between the two sensor interconnection lines M3 corresponds to a brightness increment due to left parasitic capacitance of the sensor interconnection lines and a brightness decrement due to right parasitic capacitance of the sensor interconnection lines, and thus there is no brightness variation. However, since the red sub-pixels R are disposed only at the left of the sensor interconnection lines M3 and the green sub-pixels G are disposed only at the right of the sensor interconnection lines M3, red brightness increases and green brightness decreases, resulting in generation of a color difference.

FIG. 9(C) illustrates an example in which one sensor interconnection line M1 is arranged for two sub-pixels in an RGBW pixel structure. In this example, the green sub-pixel G and white sub-pixel W are disposed only at the left of the sensor interconnection line M3 and the blue subpixel B and red sub-pixel R are disposed only at the right of the sensor interconnection line M3, and thus green and white brightness increase and blue and red brightness decrease, resulting in generation of a color sense difference.

FIG. 10 illustrates sensor interconnection line arrangements according to a first embodiment of the present disclosure.

Referring to FIG. 10, the present disclosure prevents the alignment layer from being damaged by arranging sensor interconnection lines M3 at positions that avoid the spacers CS. The sensor interconnection lines M3 and the spacers CS do not overlap. FIG. 10(A) illustrates an example in which one sensor interconnection line M3 is arranged for three sub-pixels in the RGB pixel structure and FIGS. 10(B) and 10(C) illustrate examples in which two sensor interconnection lines M3 are arranged for three sub-pixels in the RGB pixel structure. In such examples of FIG. 10, brightness of sub-pixels in a first color, disposed at the left of the sensor interconnection line M3, increases and brightness of sub-pixels in a second color, disposed at the right of the sensor interconnection line M3, decreases and thus a color difference may be generated. The first color is red in (A) and (B) and green in (C) and the second color is blue in (A) and (C) and green in (B).

The present disclosure prevents damage of the alignment layer and a color sense difference by optimizing sensor interconnection line arrangement, as shown in FIGS. 11 to 15.

FIG. 11 illustrates sensor interconnection line arrangements according to a second embodiment of the present disclosure.

Referring to FIG. 11, one sensor interconnection line M3 is arranged for two neighboring sub-pixels in the RGB pixel structure. When the number of sub-pixels arranged in one line is N (N being a positive integer equal to or greater than 2), the number of sensor interconnection lines M3 is N/2.

To prevent color sense difference, the present disclosure makes the color of sub-pixels disposed at the left of a sensor interconnection line M3 be identical to the color of sub-pixels disposed at the right of another sensor interconnection line M3. Accordingly, a color whose brightness increases due to parasitic capacitance of the sensor interconnection line M3 is identical to a color whose brightness decreases due to the parasitic capacitance of the sensor interconnection line M3 and thus a brightness increment and a brightness decrement cancel each other out, resulting in no brightness variation in the color.

In FIG. 11(A), sub-pixels are arranged in the order of a first color, a second color and a third color in one line of a pixel array. A sub-pixel in the first color is disposed at the left of a first sensor interconnection line M31 and a sub-pixel in the second color is disposed at the right of the first sensor interconnection line M31. A sub-pixel in the third color is disposed at the left of a second sensor interconnection line M32 and another sub-pixel in the first color is disposed at the right of the second sensor interconnection line M32. Another sub-pixel in the second color is disposed at the left of a third sensor interconnection line M33 and another sub-pixel in the third color is disposed at the right of the third sensor interconnection line M33. In FIG. 11(A), the sub-pixel in the first color is a green sub-pixel G, the sub-pixel in the second color is a red sub-pixel R and the sub-pixel in the third color is a blue sub-pixel B.

In FIG. 11(B), a sub-pixel in the first color is disposed at the right of the first sensor interconnection line M31, a sub-pixel in the third color is disposed at the left of the second sensor interconnection line M32, and a sub-pixel in the second color is disposed at the right of the third sensor interconnection line M33. A sub-pixel in the first color is disposed between the second and third sensor interconnection lines M32 and M33. A sub-pixel in the second color, a sub-pixel in the third color and a sub-pixel in the first color are arranged between the third sensor interconnection line M33 and a fourth sensor interconnection line M34. A sub-pixel in the second color is disposed between the fourth sensor interconnection line M34 and a fifth sensor interconnection line M35. A sub-pixel in the first color is disposed at the left of the fourth sensor interconnection line M34 and a sub-pixel in the third color is disposed at the right of the fifth sensor interconnection line M35. A sub-pixel in the third color, a sub-pixel in the first color and a sub-pixel in the second color are arranged between the fifth sensor interconnection line M35 and a sixth sensor interconnection line M36. A sub-pixel in the second color is disposed at the left of the sixth sensor interconnection line M36. In FIG. 11(B), the sub-pixel in the first color is a green sub-pixel G, the sub-pixel in the second color is a red sub-pixel R and the sub-pixel in the third color is a blue sub-pixel B.

FIG. 12 illustrates sensor interconnection line arrangements according to a third embodiment of the disclosure invention.

Referring to FIG. 12, two sensor interconnection lines M3 are arranged for five neighboring sub-pixels in the RGB pixel structure. When the number of sub-pixels arranged in one line is N, the number of sensor interconnection lines M3 is 2N/5.

In FIG. 12(A), sub-pixels are arranged in the order of a first color, a second color and a third color in one line of a pixel array. Three sub-pixels are arranged in the order of a second color sub-pixel, a third color sub-pixel and a first color sub-pixel between the first sensor interconnection line M31 and the second sensor interconnection line M32. A sub-pixel in the first color is disposed at the left of the first and second sensor interconnection lines M31 and M32 and a sub-pixel in the second color is disposed at the right of the first sensor interconnection line M31. A sub-pixel in the second color and a sub-pixel in the third color are arranged between the second sensor interconnection line M32 and the third sensor interconnection line M33. A sub-pixel in the third color is disposed at the left of the third sensor interconnection line M33 and a sub-pixel in the first color is disposed at the right of the third sensor interconnection line M33. A sub-pixel in the first color, a sub-pixel in the second color and a sub-pixel in the third color are arranged between the third sensor interconnection line M33 and the fourth sensor interconnection line M34. A sub-pixel in the third color is disposed at the left of the fourth sensor interconnection line M34 and a sub-pixel in the first color is disposed at the right of the fourth sensor interconnection line M34. A sub-pixel in the first color and a sub-pixel in the second color are arranged between the fourth sensor interconnection line M34 and the fifth sensor interconnection line M35. A sub-pixel in the second color is disposed at the left of the fifth sensor interconnection line M35 and a sub-pixel in the third color is disposed at the right of the fifth sensor interconnection line M35. A sub-pixel in the third color, a sub-pixel in the first color and a sub-pixel in the second color are arranged between the fifth sensor interconnection line M35 and the sixth sensor interconnection line M36. A sub-pixel in the second color is disposed at the left of the sixth sensor interconnection line M36 and a sub-pixel in the third color is disposed at the right of the sixth sensor interconnection line M36. In FIG. 12(A), the first color sub-pixel is a green sub-pixel G, the second color sub-pixel is a red sub-pixel R and the third color sub-pixel is a blue sub-pixel B.

In FIG. 12(B), four sub-pixels are arranged in the order of a sub-pixel in the first color, a sub-pixel in the second color, a sub-pixel in the third color and a sub-pixel in the first color between the first sensor interconnection line M31 and the second sensor interconnection line M32. A sub-pixel in the first color is disposed at the right of the first sensor interconnection line M31 and another sub-pixel in the first color is disposed at the left of the second sensor interconnection line M32. A sub-pixel in the second color is arranged between the second sensor interconnection line M32 and the third sensor interconnection line M33. A sub-pixel in the third color is disposed at the right of the third sensor interconnection line M33. A sub-pixel in the third color, a sub-pixel in the first color, a sub-pixel in the second color and a sub-pixel in the third color are arranged between the third sensor interconnection line M33 and the fourth sensor interconnection line M34. A sub-pixel in the first color is disposed between the fourth sensor interconnection line M34 and the fifth sensor interconnection line M35. A sub-pixel in the third color is disposed at the left of the fourth sensor interconnection line M34 and a sub-pixel in the second color is disposed at the left of the fifth sensor interconnection line M35. A sub-pixel in the second color, a sub-pixel in the third color, a sub-pixel in the first color and a sub-pixel in the second color are arranged between the fifth sensor interconnection line M35 and the sixth sensor interconnection line M36. A sub-pixel in the second color is disposed at the left of the sixth sensor interconnection line M36.

Figure 13:
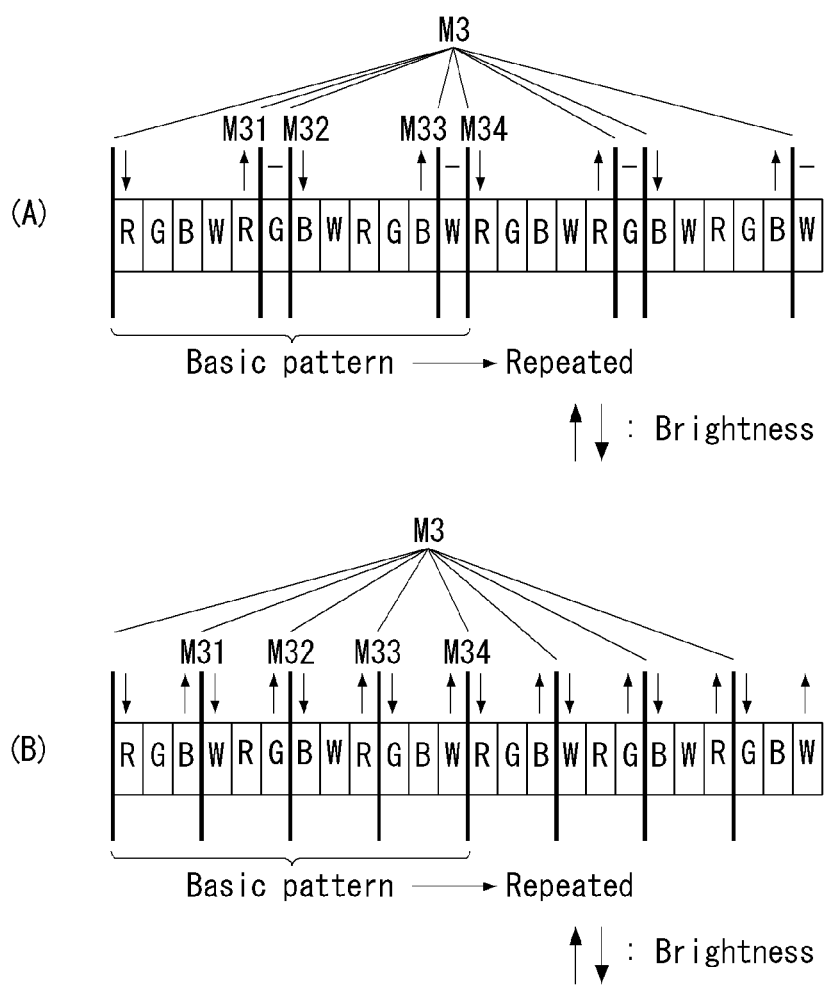
FIG. 13 illustrates sensor interconnection line arrangements according to a fourth embodiment of the present disclosure.

FIG. 13 illustrates sensor interconnection line arrangements according to a fourth embodiment of the present disclosure.

Referring to FIG. 13, one sensor interconnection line M3 is arranged for three neighboring sub-pixels in the RGBW pixel structure. When the number of sub-pixels arranged in one line is N, the number of sensor interconnection lines M3 is N/3.

In FIG. 13(A), sub-pixels are arranged in the order of a first color, a second color, a third color and a fourth color in one line of a pixel array. A sub-pixel in the second color is disposed between the first sensor interconnection line M31 and the second sensor interconnection line M32. A sub-pixel in the first color is disposed at the left of the first interconnection line M31 and a sub-pixel in the third color is disposed at the right of the second sensor interconnection line M32. Five sub-pixels are arranged in the order of a sub-pixel in the third color, a sub-pixel in the fourth color, a sub-pixel in the first color, a sub-pixel in the second color and a sub-pixel in the third color are arranged between the second sensor interconnection line M32 and the third sensor interconnection line M33. A sub-pixel in the fourth color is disposed between the third sensor interconnection line M33 and the fourth sensor interconnection line M34. A sub-pixel in the third color is disposed at the left of the third sensor interconnection line M33 and a sub-pixel in the first color is disposed at the right of the fourth sensor interconnection line M34. In FIG. 13(A), the first color sub-pixel is a red sub-pixel R, the second color sub-pixel is a green sub-pixel G, the third color sub-pixel is a blue sub-pixel B and the fourth color sub-pixel is a white sub-pixel W.

In FIG. 13(B), a sub-pixel in the third color is disposed at the left of the first sensor interconnection line M31 and a sub-pixel in the fourth color is disposed at the right of the first sensor interconnection line M31. Three sub-pixels are arranged in the order of a sub-pixel in the fourth color, a sub-pixel in the first color and a sub-pixel in the second color between the first sensor interconnection line M31 and the second sensor interconnection line M32. A sub-pixel in the second color is disposed at the left of the second sensor interconnection line M32 and a sub-pixel in the third color is disposed at the right of the second sensor interconnection line M32. A sub-pixel in the third color, a sub-pixel in the fourth color and a sub-pixel in the first color are arranged between the second sensor interconnection line M32 and the third sensor interconnection line M33. A sub-pixel in the first color is disposed at the left of the third sensor interconnection line M33 and a sub-pixel in the second color is disposed at the right of the third sensor interconnection line M33. A sub-pixel in the second color, a sub-pixel in the third color and a sub-pixel in the fourth color are arranged between the third sensor interconnection line M33 and the fourth sensor interconnection line M34. A sub-pixel in the fourth color is disposed at the left of the fourth sensor interconnection line M34 and a sub-pixel in the first color is disposed at the right of the fourth sensor interconnection line M34. In FIG. 13(B), the first color sub-pixel is a red sub-pixel R, the second color sub-pixel is a green sub-pixel G, the third color sub-pixel is a blue sub-pixel B and the fourth color sub-pixel is a white sub-pixel W.

Figure 14:
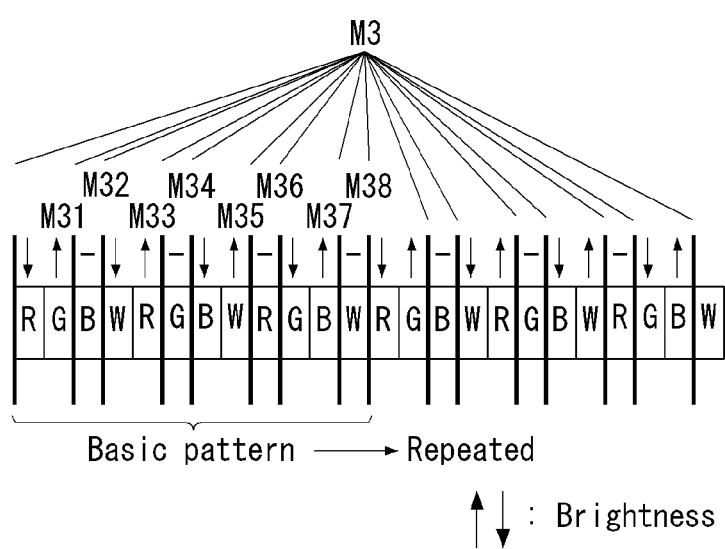
FIG. 14 illustrates a sensor interconnection line arrangement according to a fifth embodiment of the present disclosure.

FIG. 14 illustrates sensor interconnection line arrangements according to a fifth embodiment of the present disclosure.

Referring to FIG. 14, two sensor interconnection lines M3 are arranged for three neighboring sub-pixels in the RGBW pixel structure. When the number of sub-pixels arranged in one line is N, the number of sensor interconnection lines M3 is 2N/3. Sub-pixels are arranged in the order of a first color, a second color, a third color and a fourth color in one line of a pixel array. A sub-pixel in the third color is disposed between the first sensor interconnection line M31 and the second sensor interconnection line M32. A sub-pixel in the second color is disposed at the left of the first sensor interconnection line M31 and a sub-pixel in the fourth color is disposed at the right of the second sensor interconnection line M32. A sub-pixel in the fourth color and a sub-pixel in the first color are arranged between the second sensor interconnection line M32 and the third sensor interconnection line M33. A sub-pixel in the second color is disposed between the third sensor interconnection line M33 and the fourth sensor interconnection line M34. A sub-pixel in the first color is disposed at the left of the third sensor interconnection line M33 and a sub-pixel in the third color is disposed at the right of the fourth sensor interconnection line M34. A sub-pixel in the third color and a sub-pixel in the fourth color are arranged between the fourth sensor interconnection line M34 and the fifth sensor interconnection line M35. A sub-pixel in the first color is disposed between the fifth sensor interconnection line M35 and the sixth sensor interconnection line M36. A sub-pixel in the fourth color is disposed at the left of the fifth sensor interconnection line M35 and a sub-pixel in the second color is disposed at the right of the sixth sensor interconnection line M36. A sub-pixel in the second color and a sub-pixel in the third color are arranged between the sixth sensor interconnection line M36 and the seventh sensor interconnection line M37. A sub-pixel in the fourth color is disposed between the seventh sensor interconnection line M37 and the eighth sensor interconnection line M38. A sub-pixel in the third color is disposed at the left of the seventh sensor interconnection line M37 and a sub-pixel in the first color is disposed at the right of the eighth sensor interconnection line M38. In FIG. 14, the first color sub-pixel is a red sub-pixel R, the second color sub-pixel is a green sub-pixel G, the third color sub-pixel is a blue sub-pixel B and the fourth color sub-pixel is a white sub-pixel W.

Figure 15:
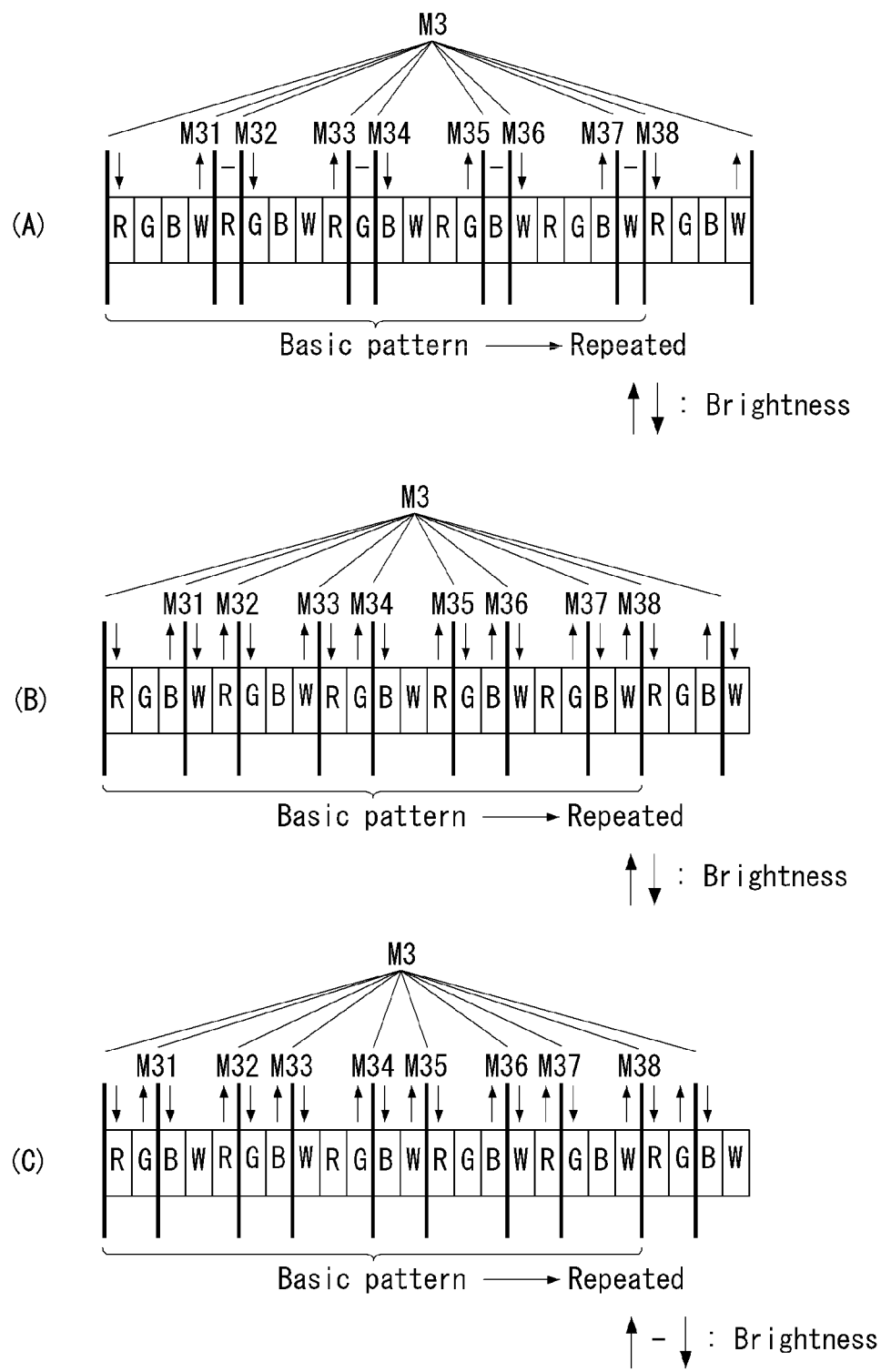
FIG. 15 illustrates sensor interconnection line arrangements according to a sixth embodiment of the present disclosure.

FIG. 15 illustrates sensor interconnection line arrangements according to a sixth embodiment of the present disclosure.

Referring to FIG. 15, two sensor interconnection lines M3 are arranged for five neighboring sub-pixels in the RGBW pixel structure. When the number of sub-pixels arranged in one line is N, the number of sensor interconnection lines M3 is 2N/5.

In FIG. 15(A), a sub-pixel in the first color is disposed between the first sensor interconnection line M31 and the second sensor interconnection line M32. A sub-pixel in the fourth color is disposed at the left of the first sensor interconnection line M31 and a sub-pixel in the second color is disposed at the right of the second sensor interconnection line M32. Four sub-pixels are arranged in the order of a sub-pixel in the second color, a sub-pixel in the third color, a sub-pixel in the fourth color and a sub-pixel in the first color between the second sensor interconnection line M32 and the third sensor interconnection line M33. A sub-pixel in the second color is disposed between the third sensor interconnection line M33 and the fourth sensor interconnection line M34. A sub-pixel in the first color is disposed at the left of the third sensor interconnection line M33 and a sub-pixel in the third color is disposed at the right of the fourth sensor interconnection line M34. Four sub-pixels are arranged in the order of a sub-pixel in the third color, a sub-pixel in the fourth color, a sub-pixel in the first color and a sub-pixel in the second color between the fourth sensor interconnection line M34 and the fifth sensor interconnection line M35. A sub-pixel in the third color is disposed between the fifth sensor interconnection line M35 and the sixth sensor interconnection line M36. A sub-pixel in the second color is disposed at the left of the fifth sensor interconnection line M35 and a sub-pixel in the fourth color is disposed at the right of the sixth sensor interconnection line M36. Four sub-pixels are arranged in the order of a sub-pixel in the fourth color, a sub-pixel in the first color, a sub-pixel in the second color and a sub-pixel in the third color between the sixth sensor interconnection line M36 and the seventh sensor interconnection line M37. A sub-pixel in the fourth color is disposed between the seventh sensor interconnection line M37 and the eighth sensor interconnection line M38. A sub-pixel in the third color is disposed at the left of the seventh sensor interconnection line M37 and a sub-pixel in the first color is disposed at the right of the eighth sensor interconnection line M38. In FIG. 15(A), the first color sub-pixel is a red sub-pixel R, the second color sub-pixel is a green sub-pixel G, the third color sub-pixel is a blue sub-pixel B and the fourth color sub-pixel is a white sub-pixel W.

In FIG. 15(B), a sub-pixel in the fourth color and a sub-pixel in the first color are arranged between the first sensor interconnection line M31 and the second sensor interconnection line M32. A sub-pixel in the third color is disposed at the left of the first sensor interconnection line M31 and a sub-pixel in the fourth color is disposed at the right of the first sensor interconnection line M31. A sub-pixel in the first color is disposed at the left of the second sensor interconnection line M32 and a sub-pixel in the second color is disposed at the right of the second sensor interconnection line M32. Three sub-pixels are arranged in the order of a sub-pixel in the second color, a sub-pixel in the third color and a sub-pixel in the fourth color between the second sensor interconnection line M32 and the third sensor interconnection line M33. A sub-pixel in the first color and a sub-pixel in the second color are arranged between the third sensor interconnection line M33 and the fourth sensor interconnection line M34. A sub-pixel in the fourth color is disposed at the left of the third sensor interconnection line M33 and a sub-pixel in the first color is disposed at the right of the third sensor interconnection line M33. A sub-pixel in the second color is disposed at the left of the fourth sensor interconnection line M34 and a sub-pixel in the third color is disposed at the right of the fourth sensor interconnection line M34. A sub-pixel in the third color, a sub-pixel in the fourth color and a sub-pixel in the first color are arranged between the fourth sensor interconnection line M34 and the fifth sensor interconnection line M35. A sub-pixel in the second color and a sub-pixel in the third color are arranged between the fifth sensor interconnection line M35 and the sixth sensor interconnection line M36. A sub-pixel in the first color is disposed at the left of the fifth sensor interconnection line M35 and a sub-pixel in the second color is disposed at the right of the fifth sensor interconnection line M35. A sub-pixel in the third color is disposed at the left of the sixth sensor interconnection line M36 and a sub-pixel in the fourth color is disposed at the right of the sixth sensor interconnection line M36. A sub-pixel in the fourth color, a sub-pixel in the first color and a sub-pixel in the second color are arranged between the sixth sensor interconnection line M36 and the seventh sensor interconnection line M37. A sub-pixel in the third color and a sub-pixel in the fourth color are arranged between the seventh sensor interconnection line M37 and the eighth sensor interconnection line M38. A sub-pixel in the second color is disposed at the left of the seventh sensor interconnection line M37 and a sub-pixel in the third color is disposed at the right of the seventh sensor interconnection line M37. A sub-pixel in the fourth color is disposed at the left of the eighth sensor interconnection line M38 and a sub-pixel in the first color is disposed at the right of the eighth sensor interconnection line M38. In FIG. 15(B), the first color sub-pixel is a red sub-pixel R, the second color sub-pixel is a green sub-pixel G, the third color sub-pixel is a blue sub-pixel B and the fourth color sub-pixel is a white sub-pixel W.

In FIG. 15(C), three sub-pixels are arranged in the order of a sub-pixel in the third color, a sub-pixel in the fourth color and a sub-pixel in the first color between the first sensor interconnection line M31 and the second sensor interconnection line M32. A sub-pixel in the second color and a sub-pixel in the third color are arranged between the second sensor interconnection line M32 and the third sensor interconnection line M33. A sub-pixel in the second color is disposed at the left of the first sensor interconnection line M31 and a sub-pixel in the third color is disposed at the right of the first sensor interconnection line M31. A sub-pixel in the first color is disposed at the left of the second sensor interconnection line M32 and a sub-pixel in the second color is disposed at the right of the second sensor interconnection line M32. A sub-pixel in the first color, a sub-pixel in the second color and a sub-pixel in the third color are arranged between the third sensor interconnection line M33 and the fourth sensor interconnection line M34. A sub-pixel in the third color and a sub-pixel in the fourth color are arranged between the fourth sensor interconnection line M34 and the fifth sensor interconnection line M35. A sub-pixel in the third color is disposed at the left of the third sensor interconnection line M33 and a sub-pixel in the fourth color is disposed at the right of the third sensor interconnection line M33. A sub-pixel in the second color is disposed at the left of the fourth sensor interconnection line M34 and a sub-pixel in the third color is disposed at the right of the fourth sensor interconnection line M34. A sub-pixel in the first color, a sub-pixel in the second color and a sub-pixel in the third color are arranged between the fifth sensor interconnection line M35 and the sixth sensor interconnection line M36. A sub-pixel in the fourth color and a sub-pixel in the first color are arranged between the sixth sensor interconnection line M36 and the seventh sensor interconnection line M37. A sub-pixel in the fourth color is disposed at the left of the fifth sensor interconnection line M35 and a sub-pixel in the first color is disposed at the right of the fifth sensor interconnection line M35. A sub-pixel in the third color is disposed at the left of the sixth sensor interconnection line M36 and a sub-pixel in the fourth color is disposed at the right of the sixth sensor interconnection line M36. A sub-pixel in the second color, a sub-pixel in the third color and a sub-pixel in the fourth color are arranged between the seventh sensor interconnection line M37 and the eighth sensor interconnection line M38. A sub-pixel in the first color is disposed at the left of the seventh sensor interconnection line M37 and a sub-pixel in the second color is disposed at the right of the seventh sensor interconnection line M37. A sub-pixel in the fourth color is disposed at the left of the eighth sensor interconnection line M38 and a sub-pixel in the first color is disposed at the right of the eighth sensor interconnection line M38. In FIG. 15(C), the first color sub-pixel is a red sub-pixel R, the second color sub-pixel is a green sub-pixel G, the third color sub-pixel is a blue sub-pixel B and the fourth color sub-pixel is a white sub-pixel W.

As can be seen from FIGS. 11 to 15, the present disclosure assigns the same number of sub-pixels to the left and right of the sensor interconnection lines M3 for each color. The number of sub-pixels in the first color, disposed at the left of the sensor interconnection lines M3, is equal to the number of sub-pixels in the first color, disposed at the right of the sensor interconnection lines M3. The number of sub-pixels in the second color, disposed at the left of the sensor interconnection lines M3, is equal to the number of sub-pixels in the second color, disposed at the right of the sensor interconnection lines M3. The number of sub-pixels in the third color, disposed at the left of the sensor interconnection lines M3, is equal to the number of sub-pixels in the third color, disposed at the right of the sensor interconnection lines M3. The number of sub-pixels in the fourth color, disposed at the left of the sensor interconnection lines M3, is equal to the number of sub-pixels in the fourth color, disposed at the right of the sensor interconnection lines M3. Consequently, the number of sub-pixels having increased brightness equals the number of sub-pixels having decreased brightness for each color, and thus a brightness increment and a brightness decrement cancel each other out, resulting in no brightness variation.

FIG. 16 is a view showing a pixel position at which a spacer is disposed and a pixel position having no spacer according to the present invention.

Referring to FIG. 16, the present invention prevents the alignment layer from being damaged due to the spacers CS by arranging the spacers CS such that the spacers CS are not superposed over the sensor interconnection lines M3 in the cross section of the display panel. In the case of a display panel having a large aperture ratio decrease due to the spacer CS, the spacer CS can be disposed between a red sub-pixel and a blue sub-pixel rather than being disposed at a green sub-pixel. When red, green and blue sub-pixels have the same aperture ratio even when the spacer is disposed, the spacer can be disposed at any sub-pixel.

The spacer CS is disposed at a position which does not correspond to the sensor interconnection line M3, for example, between neighboring sensor interconnection lines M3.

As described above, the present disclosure can prevent color deterioration due to parasitic capacitance of sensor electrodes by respectively arranging the same number of sub-pixels on the left and right of sensor interconnection lines. Furthermore, the present invention can prevent the alignment layer from being damaged due to the touch sensor embedded in the pixel array by arranging the sensor interconnection lines at positions that avoid positions of spacers.

As the present features may be embodied in several forms without departing from the characteristics thereof, it should also be understood that the above-described embodiments are not limited by any of the details of the foregoing description, unless otherwise specified, but rather should be considered broadly within the scope as defined in the appended claims, and therefore all changes and modifications that fall within the metes and bounds of the claims, or equivalents of such metes and bounds, are therefore intended to be embraced by the appended claims.

What is claimed is:

1. A touch sensing display device supporting a display driving period and a touch sensor driving period in each frame period, the device comprising:
    a display panel including a plurality of data lines and a plurality of sensor interconnection lines, the plurality of data lines connected to a plurality of pixels of the display panel, and the plurality of sensor interconnection lines connected to a plurality of touch electrodes of the display panel, each pixel including a plurality of sub-pixels that each display a distinct color;
    a data driver that drives data signals to the plurality of pixels via the plurality of data lines during the display driving period of the frame period; and
    a touch sensor driver that applies a touch driving voltage for sensing touch to the plurality of touch electrodes via the plurality of sensor interconnection lines during the touch sensor driving period of the frame period, and the touch sensor driver applies a common voltage to the plurality of touch electrodes via the plurality of sensor interconnection lines during the display drive period of the frame period, the touch sensor driving period non-overlapping with the pixel driving period;
    wherein a pattern of sub-pixels for the entire display device is arranged in the display panel such that a same number of sub-pixels for each distinct color is arranged adjacent to a first side and adjacent to a second side of one or more of the plurality of sensor interconnection lines, each of the sub-pixels for each distinct color being adjacent to either the first side or the second side of a corresponding one of the sensor interconnection lines.

2. The touch sensing display device of claim 1, wherein none of the plurality of sensor interconnection lines overlap with spacers located between substrates of the display device, the spacers maintaining a cell gap of a liquid crystal layer formed between the substrates.

3. The touch sensing display device of claim 1, wherein color emitted by sub-pixels adjacent to the first side of the one or more of the plurality of sensor interconnection lines is brighter than color emitted by sub-pixels adjacent to the second side of the one or more of the plurality of sensor interconnection lines.

4. The touch sensing display device of claim 1, wherein each of the plurality of sensor interconnection lines is arranged at a boundary between adjacent sub-pixels, and
    wherein the plurality of sensor interconnection lines are arranged directly over the plurality of data lines with an insulating layer arranged between the plurality of sensor interconnection lines and the plurality of data lines.

5. The touch sensing display device of claim 1, wherein the pattern of sub-pixels repeats across the plurality of sub-pixels of the display panel.

6. The touch sensing display device of claim 1, wherein each of the plurality of sensor interconnection lines is coupled to two adjacent sub-pixels in the display panel.

7. The touch sensing display device of claim 6, wherein the plurality of sub-pixels comprises:
    a first sub-pixel of a first color adjacent to the second side of a first sensor interconnection line and a second sub-pixel of a second color adjacent to the first side of a second sensor interconnection line, wherein the first sub-pixel and second sub-pixel are adjacent to each other;

a third sub-pixel of a third color adjacent to the second side of the second sensor interconnection line and a fourth sub-pixel of the first color adjacent to the first side of a third sensor interconnection line, wherein the third sub-pixel and the fourth sub-pixel adjacent to each other; and a fifth sub-pixel of the second color is adjacent to the second side of the third sensor interconnection line and a sixth sub-pixel of the third color adjacent to the first side of a fourth sensor interconnection line, wherein the fifth sub-pixel and the sixth sub-pixel adjacent to each other.

8. The touch sensing display device of claim 7, wherein the first color is blue, the second color is green, and the third color is red.

9. The touch sensing display device of claim 6, wherein the plurality of sub-pixels comprises:

a first sub-pixel of a first color adjacent to the second side of a first sensor interconnection line and adjacent to the first side of a second sensor interconnection line;

a second sub-pixel of a second color adjacent to the second side of the second sensor interconnection line and a third sub-pixel of the first color adjacent to the first side of a third sensor interconnection line, and wherein a fourth sub-pixel of a third color is between the second sub-pixel and the third sub-pixel;

a fifth sub-pixel of the second color adjacent to the second side of the third sensor interconnection line and adjacent to the first side of a fourth sensor interconnection line;

a sixth sub-pixel of the third color adjacent to the second side of the fourth sensor interconnection line and a seventh sub-pixel of the second color adjacent to the first side of a fifth sensor interconnection line, and wherein an eighth sub-pixel of the first color is between the sixth sub-pixel and the seventh sub-pixel;

a ninth sub-pixel of the third color adjacent to the second side of the fifth sensor interconnection line and adjacent to the first side of a sixth sensor interconnection line;

a tenth sub-pixel of the first color adjacent to the second side of the sixth sensor interconnection line and an eleventh sub-pixel of the third color adjacent to the first side of a seventh sensor interconnection line, and wherein a twelfth sub-pixel of the second color is between the tenth sub-pixel and the eleventh sub-pixel.

10. The touch sensing display device of claim 1, wherein two sensor interconnection lines of the plurality of sensor interconnection lines are coupled to five adjacent sub-pixels in the display panel.

11. The touch sensing display device of claim 10, wherein the plurality of sub-pixels comprises:

a first sub-pixel of a first color adjacent to the second side of a first sensor interconnection line and a second sub-pixel of a second color adjacent to the first side of a second sensor interconnection line, wherein the first sub-pixel and the second sub-pixel are adjacent to each other;

a third sub-pixel of a third color adjacent to the second side of the second sensor interconnection line and a fourth sub-pixel of the second color adjacent to the first side of a third sensor interconnection line, and wherein a fifth sub-pixel of the first color is between the third sub-pixel and the fourth sub-pixel;

a sixth sub-pixel of the third color adjacent to the second side of the third sensor interconnection line and a seventh sub-pixel of the first color adjacent to the first side of a fourth sensor interconnection line, wherein the sixth sub-pixel and the seventh sub-pixel are adjacent to each other;

an eighth sub-pixel of the second color adjacent to the second side of the fourth sensor interconnection line and a ninth sub-pixel of the first color adjacent to the first side of a fifth sensor interconnection line, and wherein a tenth sub-pixel of the third color is between the eighth sub-pixel and the ninth sub-pixel;

an eleventh sub-pixel of the second color adjacent to the second side of the fifth sensor interconnection line and a twelfth sub-pixel of the third color adjacent to the first side of a sixth sensor interconnection line, wherein the eleventh sub-pixel and the twelfth sub-pixel are adjacent to each other; and a thirteenth sub-pixel of the first color adjacent to the second side of the sixth sensor interconnection line and a fourteenth sub-pixel of the third color adjacent to the first side of a seventh sensor interconnection line, and wherein a fifteenth sub-pixel of the second color is between the thirteenth sub-pixel and the fourteenth sub-pixel.

12. The touch sensing display device of claim 10, wherein the plurality of sub-pixels comprises:

a first sub-pixel of a first color adjacent to the second side of a first sensor interconnection line and adjacent to the first side of a second sensor interconnection line;

a second sub-pixel of a second color adjacent to the second side of the second sensor interconnection line and a third sub-pixel of the second color adjacent to the first side of a third sensor interconnection line, and wherein a fourth sub-pixel of a third color and a fifth sub-pixel of the first color are between the second sub-pixel and the third sub-pixel;

a sixth sub-pixel of the third color adjacent to the second side of the third sensor interconnection line and adjacent to the first side of a fourth sensor interconnection line;

a seventh sub-pixel of the first color adjacent to the second side of the fourth sensor interconnection line and an eighth sub-pixel of the first color adjacent to the first side of a fifth sensor interconnection line, and wherein a ninth sub-pixel of the second color and a tenth sub-pixel of the third color are between the seventh sub-pixel and the eighth sub-pixel;

a ninth sub-pixel of the second color adjacent to the second side of the fifth sensor interconnection line and adjacent to the first side of a sixth sensor interconnection line; and an eleventh sub-pixel of the third color adjacent to the second side of the sixth sensor interconnection line and a twelfth sub-pixel of the third color adjacent to the first side of a seventh sensor interconnection line, and wherein a thirteenth sub-pixel of the first color and a fourteenth sub-pixel of the second color are between the eleventh sub-pixel and the twelfth sub-pixel.

13. The touch sensing display device of claim 1, wherein each of the plurality of sensor interconnection lines is coupled to three adjacent sub-pixels in the display panel.

14. The touch sensing display device of claim 13, wherein the plurality of sub-pixels comprises:

a first sub-pixel of a first color adjacent to the second side of a first sensor interconnection line and a second sub-pixel of the first color adjacent to the first side of a second sensor interconnection line, and wherein a third sub-pixel of a second color, a fourth sub-pixel of a third color, and a fifth sub-pixel of a fourth color are between the first sub-pixel and the second sub-pixel;
a sixth sub-pixel of the second color adjacent to the second side of the second sensor interconnection line and adjacent to the first side of a third sensor interconnection line;
a seventh sub-pixel of the third color adjacent to the second side of the third sensor interconnection line and an eighth sub-pixel of the third color adjacent to the first side of a fourth sensor interconnection line, and wherein a ninth sub-pixel of the fourth color, a tenth sub-pixel of the first color, and an eleventh sub-pixel of the second color are between the seventh sub-pixel and the eighth sub-pixel; and
a twelfth sub-pixel of the fourth color adjacent to the second side of the fourth sensor interconnection line and adjacent to the first side of a fifth sensor interconnection line.

15. The touch sensing display device of claim 13, wherein the plurality of sub-pixels comprises:
a first sub-pixel of a first color adjacent to the second side of a first sensor interconnection line and a second sub-pixel of a second color adjacent to the first side of a second sensor interconnection line, and wherein a third sub-pixel of a third color is between the first sub-pixel and the second sub-pixel;
a fourth sub-pixel of a fourth color adjacent to the second side of the second sensor interconnection line and a fifth sub-pixel of the third color adjacent to the first side of a third sensor interconnection line, and wherein a sixth sub-pixel of the first color is between the fourth sub-pixel and the fifth sub-pixel;
a seventh sub-pixel of the second color adjacent to the second side of the third sensor interconnection line and an eighth sub-pixel of the first color adjacent to the first side of a fourth sensor interconnection line, and wherein a ninth sub-pixel of the fourth color is between the seventh sub-pixel and the eighth sub-pixel; and
a tenth sub-pixel of the second color adjacent to the second side of the fourth sensor interconnection line and an eleventh sub-pixel of the fourth color adjacent to the first side of a fifth sensor interconnection line, and wherein a twelfth sub-pixel of the second color is between the tenth sub-pixel and the eleventh sub-pixel.

16. The touch sensing display device of claim 1, wherein two of the plurality of sensor interconnection lines are coupled to three adjacent sub-pixels in the display panel.

17. The touch sensing display device of claim 16, wherein the plurality of sub-pixels comprises:
a first sub-pixel of a first color adjacent to the second side of a first sensor interconnection line and a second sub-pixel of a second color adjacent to the first side of a second sensor interconnection line, wherein the first sub-pixel and the second sub-pixel are adjacent to each other;
a third sub-pixel of a third color adjacent to the second side of the second sensor interconnection line and adjacent to the first side of a third sensor interconnection line;
a fourth sub-pixel of a fourth color adjacent to the second side of the third sensor interconnection line and a fifth sub-pixel of the first color adjacent to the first side of a fourth sensor interconnection line, wherein the fourth sub-pixel and the fifth sub-pixel are adjacent to each other;
a sixth sub-pixel of the second color adjacent to the second side of the fourth sensor interconnection line and adjacent to the first side of a fifth sensor interconnection line;
a seventh sub-pixel of the third color adjacent to the second side of the fifth sensor interconnection line and an eighth sub-pixel of the fourth color adjacent to the first side of a sixth sensor interconnection line, wherein the seventh sub-pixel and the eighth sub-pixel are adjacent to each other;
a ninth sub-pixel of the first color adjacent to the second side of the sixth sensor interconnection line and adjacent to the first side of a seventh sensor interconnection line;
a tenth sub-pixel of the second color adjacent to the second side of the sixth sensor interconnection line and an eleventh sub-pixel of the third color adjacent to the first side of an eighth sensor interconnection line, wherein the tenth sub-pixel and the eleventh sub-pixel are adjacent to each other; and
a twelfth sub-pixel of the fourth color adjacent to the second side of the eighth sensor interconnection line and adjacent to the first side of a ninth sensor interconnection line.

18. The touch sensing display device of claim 1, wherein two of the plurality of sensor interconnection lines are coupled to five adjacent sub-pixels in the display panel.

19. The touch sensing display device of claim 18, wherein the plurality of sub-pixels comprises:
a first sub-pixel of a first color adjacent to the second side of a first sensor interconnection line and a second sub-pixel of a second color adjacent to the first side of a second sensor interconnection line, and wherein a third sub-pixel of a third color and a fourth sub-pixel of a fourth color are between the first sub-pixel and the second sub-pixel;
a fifth sub-pixel of the first color adjacent to the second side of the second sensor interconnection line and adjacent to the first side of a third sensor interconnection line;
a sixth sub-pixel of the third color adjacent to the second side of the third sensor interconnection line and a seventh sub-pixel of the first color adjacent to the first side of a fourth sensor interconnection line, and wherein an eighth sub-pixel of the fourth color and a ninth sub-pixel of the second color are between the sixth sub-pixel and the seventh sub-pixel;
a tenth sub-pixel of the third color adjacent to the second side of the fourth sensor interconnection line and adjacent to the first side of a fifth sensor interconnection line;
an eleventh sub-pixel of the fourth color adjacent to the second side of the fifth sensor interconnection line and a twelfth sub-pixel of the third color adjacent to the first side of a sixth sensor interconnection line, and wherein an thirteenth sub-pixel of the second color and a fourteenth sub-pixel of the first color are between the eleventh sub-pixel and the twelfth sub-pixel;
a fifteenth sub-pixel of the fourth color adjacent to the second side of the sixth sensor interconnection line and adjacent to the first side of a seventh sensor interconnection line;
a sixteenth sub-pixel of the second color adjacent to the second side of the seventh sensor interconnection line and a seventeenth sub-pixel of the fourth color adjacent to the first side of an eighth sensor interconnection line, and wherein a nineteenth sub-pixel of the first color and a twentieth sub-pixel of the third color are between the sixteenth sub-pixel and the seventeenth sub-pixel.

20. The touch sensing display device of claim 18, wherein the plurality of sub-pixels comprises:
a first sub-pixel of a first color adjacent to the second side of a first sensor interconnection line and a second sub-pixel of a second color adjacent to the first side of a second sensor interconnection line, and wherein a third sub-pixel of a third color is between the first sub-pixel and the second sub-pixel;
a fourth sub-pixel of a fourth color adjacent to the second side of the second sensor interconnection line and a fifth sub-pixel of the first color adjacent to the first side of a third sensor interconnection line, wherein the fourth sub-pixel and the fifth sub-pixel are adjacent to each other;
a sixth sub-pixel of the third color adjacent to the second side of the third sensor interconnection line and a seventh sub-pixel of the fourth color adjacent to the first side of a fourth sensor interconnection line, and wherein an eighth sub-pixel of the second color is between the sixth sub-pixel and the seventh sub-pixel;
a ninth sub-pixel of the first color adjacent to the second side of the fourth sensor interconnection line and a tenth sub-pixel of the third color adjacent to the first side of a fifth sensor interconnection line, wherein the ninth sub-pixel and the tenth sub-pixel are adjacent to each other;
an eleventh sub-pixel of the second color adjacent to the second side of the fifth sensor interconnection line and a twelfth sub-pixel of the first color adjacent to the first side of a sixth sensor interconnection line, and wherein a thirteenth sub-pixel of the fourth color is between the eleventh sub-pixel and the twelfth sub-pixel;
a fourteenth sub-pixel of the third color adjacent to the second side of the sixth sensor interconnection line and a fifteenth sub-pixel of the second color adjacent to the first side of a seventh sensor interconnection line, wherein the fourteenth sub-pixel and the fifteenth sub-pixel are adjacent to each other;
a sixteenth sub-pixel of the fourth color adjacent to the second side of the seventh sensor interconnection line and a seventeenth sub-pixel of the third color adjacent to the first side of a eighth sensor interconnection line, and wherein an eighteenth sub-pixel of the first color is between the sixteenth sub-pixel and the seventeenth sub-pixel; and
a nineteenth sub-pixel of the second color adjacent to the second side of the eighth sensor interconnection line and a twentieth sub-pixel of the fourth color adjacent to the first side of a ninth sensor interconnection line, wherein the nineteenth sub-pixel and the twentieth sub-pixel are adjacent to each other.

21. The touch sensing display device of claim 18, wherein the plurality of sub-pixels comprises:
a first sub-pixel of a first color adjacent to the second side of a first sensor interconnection line and a second sub-pixel of a second color adjacent to the first side of a second sensor interconnection line, wherein the first sub-pixel and the second sub-pixel are adjacent to each other;
a third sub-pixel of a third color adjacent to the second side of the second sensor interconnection line and a fourth sub-pixel of the first color adjacent to the first side of a third sensor interconnection line, and wherein a fifth sub-pixel of a fourth color is between the third sub-pixel and the fourth sub-pixel;
a sixth sub-pixel of the second color adjacent to the second side of the third sensor interconnection line and a seventh sub-pixel of the third color adjacent to the first side of a fourth sensor interconnection line, wherein the sixth sub-pixel and the seventh sub-pixel are adjacent to each other;
an eighth sub-pixel of the fourth color adjacent to the second side of the fourth sensor interconnection line and a ninth sub-pixel of the second color adjacent to the first side of a fifth sensor interconnection line, and wherein a tenth sub-pixel of the first color is between the eighth sub-pixel and the ninth sub-pixel;
an eleventh sub-pixel of the third color adjacent to the second side of the fifth sensor interconnection line and a twelfth sub-pixel of the fourth color adjacent to the first side of a sixth sensor interconnection line, wherein the eleventh sub-pixel and the twelfth sub-pixel are adjacent to each other;
a thirteenth sub-pixel of the first color adjacent to the second side of the sixth sensor interconnection line and a fourteenth sub-pixel of the third color adjacent to the first side of a seventh sensor interconnection line, and wherein a fifteenth sub-pixel of the second color is between the thirteenth sub-pixel and the fourteenth sub-pixel;
a sixteenth sub-pixel of the fourth color adjacent to the second side of the seventh sensor interconnection line and a seventeenth sub-pixel of the first color adjacent to the first side of an eighth sensor interconnection line, wherein the sixteenth sub-pixel and the seventeenth sub-pixel are adjacent to each other; and
an eighteenth sub-pixel of the second color adjacent to the second side of the eighth sensor interconnection line and a nineteenth sub-pixel of the fourth color adjacent to the first side of a ninth sensor interconnection line, and wherein a twentieth sub-pixel of the third color is between the eighteenth sub-pixel and the nineteenth sub-pixel.

* * * * *